United States Patent
Kakinoki

(10) Patent No.: US 11,842,010 B2
(45) Date of Patent: Dec. 12, 2023

(54) INPUT DETECTION SYSTEM

(71) Applicant: Japan Display Inc., Tokyo (JP)

(72) Inventor: Yuto Kakinoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/941,543

(22) Filed: Sep. 9, 2022

(65) Prior Publication Data

US 2023/0004254 A1  Jan. 5, 2023

Related U.S. Application Data

(63) Continuation of application No. PCT/JP2021/008964, filed on Mar. 8, 2021.

(30) Foreign Application Priority Data

Mar. 19, 2020 (JP) ................. 2020-049820

(51) Int. Cl.
G06F 3/041 (2006.01)
G06F 3/044 (2006.01)
G01K 1/14 (2021.01)

(52) U.S. Cl.
CPC ............. *G06F 3/0418* (2013.01); *G01K 1/14* (2013.01); *G06F 3/0446* (2019.05); *G06F 3/0412* (2013.01)

(58) Field of Classification Search
CPC .... G06F 3/0418; G06F 3/0446; G06F 3/0412; G06F 3/041; G06F 3/044; G06F 3/0362; G06F 3/039; G09G 3/038; H03K 17/96; G01K 1/14

See application file for complete search history.

(56) References Cited

U.S. PATENT DOCUMENTS

2006/0256090 A1  11/2006  Huppi
2020/0301547 A1*  9/2020  Mori .................. G06F 3/0488
2021/0232269 A1  7/2021  Sasaki et al.

FOREIGN PATENT DOCUMENTS

JP  6342105 B1  6/2018
JP  6532631 B1  6/2019
WO  WO2019/082478 A1  5/2019

OTHER PUBLICATIONS

International Search Report issued in International Patent Application No. PCT/JP2021/008964 dated Apr. 13, 2021 and English translation of same. 5 pages.
Written Opinion issued in International Patent Application No. PCT/JP2021/008964 dated Apr. 13, 2021. 3 pages.

* cited by examiner

*Primary Examiner* — Michael A Faragalla
(74) *Attorney, Agent, or Firm* — K&L Gates LLP

(57) ABSTRACT

An input detection system includes a plurality of drive electrodes arrayed in a detection region, a drive signal supply circuit that supplies a drive signal to the drive electrodes, a storage circuit that stores therein a table having information about a correction value for a drive frequency of the drive signal, a correction value selection circuit that selects the correction value for the drive frequency on the basis of the table, and an input support device that includes an LC circuit, a first electrode coupled to one end side of the LC circuit, and a second electrode coupled to the other end side of the LC circuit.

8 Claims, 28 Drawing Sheets

(TABLE 3)

| DRIVE FREQUENCY | DETECTION-VALUE DRIVE-COUNT PATTERN |
|---|---|
| $X+2\Delta x$ | +10% PATTERN |
| $X+\Delta x$ | +5% PATTERN |
| $X$ | 0% PATTERN |
| $X-\Delta x$ | -5% PATTERN |
| $X-2\Delta x$ | -10% PATTERN |

INPUT DETECTION SYSTEM

CROSS-REFERENCE TO RELATED APPLICATION

This application is a continuation of International Patent Application No. PCT/JP2021/008964 filed on Mar. 8, 2021 which designates the United States, incorporated herein by reference, and which claims the benefit of priority from Japanese Patent Application No. 2020-049820 filed on Mar. 19, 2020, incorporated herein by reference.

BACKGROUND

1. Technical Field

The present disclosure relates to an input detection system.

2. Description of the Related Art

Japanese Patent Nos. 6342105 and 6532631 describe an input support device that is placed on a touch panel detecting change in electrostatic capacitance or change in a contact region and supports input operations through the touch panel. As a method for detecting the input support device, a method has been known in which the input support device is detected using resonance of a resonance circuit provided in the input support device.

Such an input support device requires proper control of a resonance frequency of the input support device and a drive frequency of the touch panel. However, temperature characteristics and variations in circuits of the input support device and a touch detection IC may make it difficult to control the frequency.

The present disclosure aims to provide an input detection system that can properly correct a drive frequency of a detection drive signal.

SUMMARY

An input detection system according to an embodiment of the present disclosure includes a plurality of drive electrodes arrayed in a detection region, a drive signal supply circuit that supplies a drive signal to the drive electrodes, a storage circuit that stores therein a table having information about a correction value for a drive frequency of the drive signal, a correction value selection circuit that selects the correction value for the drive frequency on the basis of the table, and an input support device that includes an LC circuit, a first electrode coupled to one end side of the LC circuit, and a second electrode coupled to the other end side of the LC circuit. The input support device is disposed to overlap with some of the drive electrodes, a reference potential is supplied to the drive electrode overlapping with the first electrode, and the drive signal of the drive frequency corrected on the basis of information from the correction value selection circuit is supplied to the drive electrode overlapping with the second electrode.

An input detection system according to an embodiment of the present disclosure includes a plurality of drive electrodes arrayed in a detection region, a drive signal supply circuit that supplies a drive signal to the drive electrodes, a frequency detector that detects a frequency of a signal, a correction value selection circuit that selects a correction value for a drive frequency of the drive signal, and an input support device that includes an LC circuit, a first electrode coupled to one end side of the LC circuit, and a second electrode coupled to the other end side of the LC circuit. The input support device is disposed to overlap with some of the drive electrodes, a reference potential is supplied to the drive electrode overlapping with the first electrode, the drive signal is supplied from the drive signal supply circuit to the drive electrode overlapping with the second electrode, the frequency detector detects a frequency of a signal output from the LC circuit after the supply of the drive signal is stopped, and the correction value selection circuit selects the frequency of the drive signal on the basis of the frequency of the signal output from the LC circuit.

An input detection system according to an embodiment of the present disclosure includes a plurality of drive electrodes arrayed in a detection region, a drive signal supply circuit that supplies a drive signal to the drive electrodes, a storage circuit that stores therein a table having information about a correction value for a drive frequency of the drive signal, a correction value selection circuit that selects the correction value on the basis of the table, and an input support device that includes an LC circuit, a first electrode coupled to one end side of the LC circuit, a second electrode coupled to the other end side of the LC circuit, and a switch element switching a resonance frequency of the LC circuit between a first frequency and a second frequency higher than the first frequency. The input support device is disposed to overlap with some of the drive electrodes, a reference potential is supplied to the drive electrode overlapping with the first electrode, the drive signal is supplied from the drive signal supply circuit to the drive electrode overlapping with the second electrode, and the correction value selection circuit determines switching of the switch element on the basis of a detection value when the drive signal of the first frequency is supplied to the drive electrodes.

DETAILED DESCRIPTION

Figure 1:
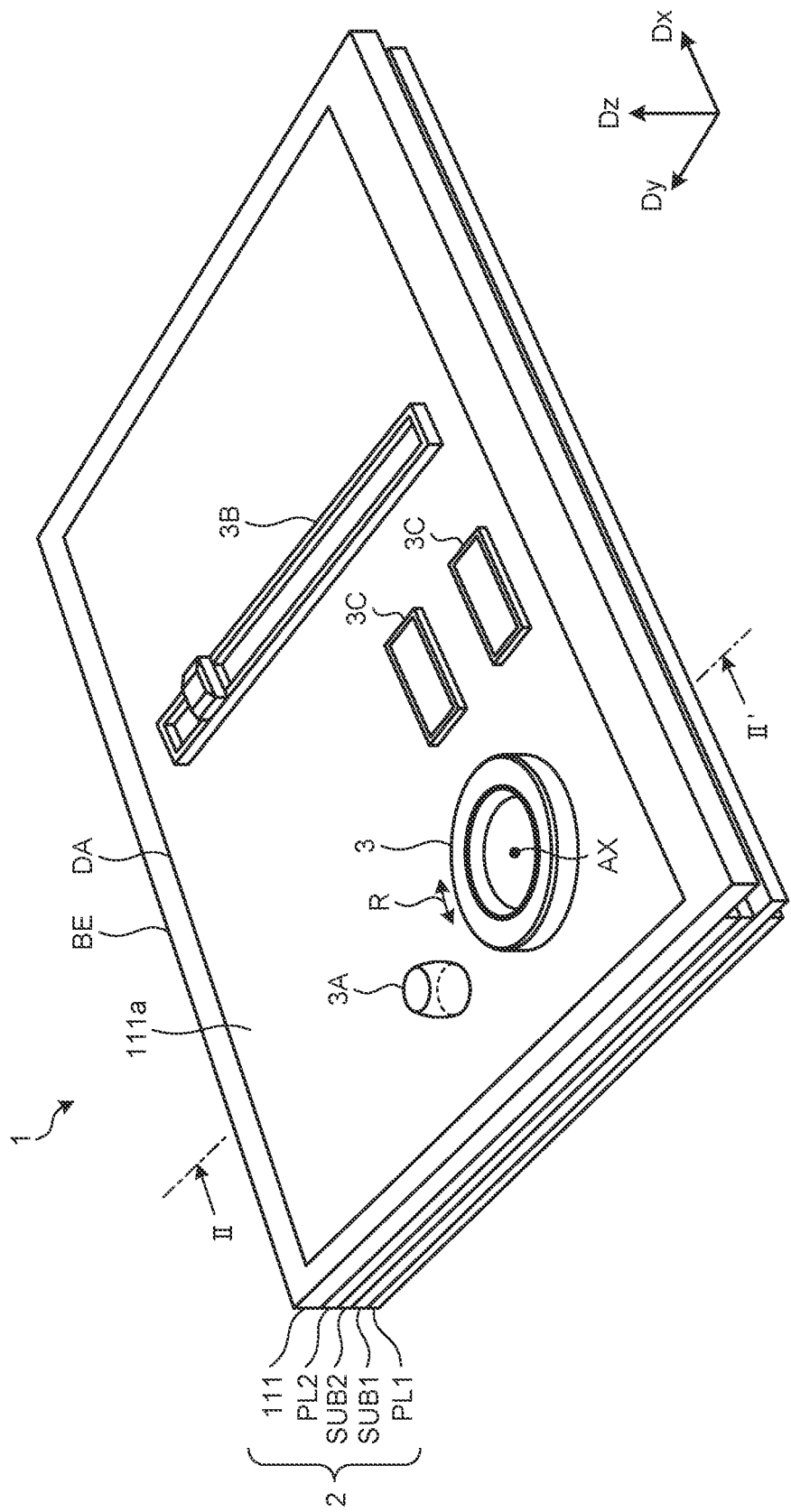
FIG. 1 is a perspective view schematically illustrating an input detection system according to a first embodiment.

Aspects for carrying out the present disclosure (embodiments) will be described in detail with reference to the drawings. Contents described in the following embodiments do not limit the present disclosure. Components described below include those that can be easily assumed by those skilled in the art and substantially the same components. Furthermore, the components described below can be appropriately combined. What is disclosed herein is merely an example, and appropriate modifications within the gist of the disclosure of which those skilled in the art can easily think are naturally encompassed in the scope of the present disclosure. In the drawings, widths, thicknesses, shapes, and the like of the components can be schematically illustrated in comparison with actual aspects for more clear explanation. They are however merely examples and do not limit interpretation of the present disclosure. In the present specification and the drawings, the same reference numerals denote components similar to those described before with reference to the drawing that has been already referred, and detail explanation thereof can be appropriately omitted.

First Embodiment

Figure 2:
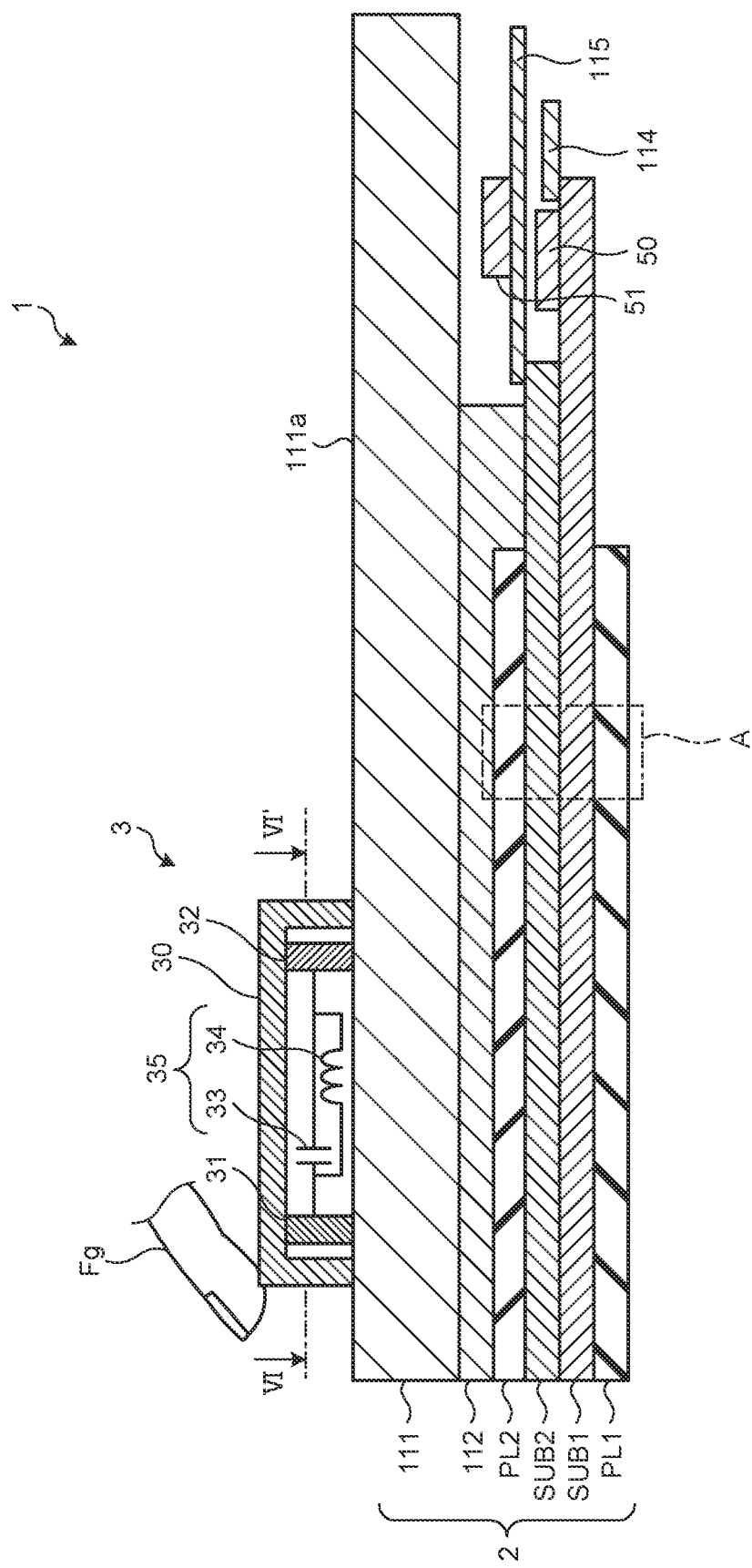
FIG. 2 is a cross-sectional view cut along line II-II' in FIG. 1.

FIG. 1 is a perspective view schematically illustrating an input detection system according to a first embodiment. FIG. 2 is a cross-sectional view cut along line II-II' in FIG. 1. As illustrated in FIGS. 1 and 2, this input detection system 1 includes a display device 2 and an input support device 3.

One direction of a plane (an upper surface 111a) of the display device 2 is a first direction Dx, and a direction orthogonal to the first direction Dx is a second direction Dy. The second direction Dy is not limited to be orthogonal to the first direction Dx and may intersect with the first direction Dx at an angle other than 90°. A third direction Dz orthogonal to the first direction Dx and the second direction Dy corresponds to the thickness direction of an array substrate SUB1.

As illustrated in FIGS. 1 and 2, the display device 2 includes the array substrate SUB1, a counter substrate SUB2, a first polarizing plate PL1, a second polarizing plate PL2, a cover member 111, and an adhesive layer 112 (which is omitted in FIG. 1). The first polarizing plate PL1, the array substrate SUB1, the counter substrate SUB2, the second polarizing plate PL2, the adhesive layer 112, and the cover member 111 are stacked in this order in the third direction Dz.

The array substrate SUB1 is a drive circuit substrate for driving a plurality of pixels PX. The array substrate SUB1 includes a first substrate 10 as a base body. The array substrate SUB1 includes switching elements Tr and various wiring lines such as scan lines GL and pixel signal lines SL (refer to FIG. 4) that are provided on the first substrate 10. The counter substrate SUB2, which is provided to face the array substrate SUB1, includes a second substrate 20 as the base body. The counter substrate SUB2 includes color filters CF, a light-shielding layer BM (refer to FIG. 3), and the like that are provided on the second substrate 20. The first substrate 10 and the second substrate 20 are formed of a material having a light transmitting property such as a glass substrate or a resin substrate.

The length of the array substrate SUB1 in the second direction Dy is longer than that of the counter substrate SUB2 in the second direction Dy. As illustrated in FIG. 1, the first substrate 10 has a portion that extends outward from the second substrate 20. The length of the array substrate SUB1 in the second direction Dy is shorter than the length thereof in the first direction Dx. The length of the counter substrate SUB2 in the second direction Dy is shorter than the length thereof in the first direction Dx. The lengths are, however, not limited thereto. The length of the array substrate SUB1 in the second direction Dy may be longer than the length thereof in the first direction Dx. The length of the counter substrate SUB2 in the second direction Dy may be longer than the length thereof in the first direction Dx.

A display integrated circuit (IC) 50 and a wiring substrate 114 are coupled to the extending portion of the array substrate SUB1. The display IC 50 includes a control circuit that controls display of the display device 2 and touch detection. Arrangement of the display IC 50 is not limited to this example and may be mounted on the wiring substrate 114. Arrangement of the display IC 50 is not limited thereto, and the display IC 50 may be provided on a control substrate or a flexible substrate outside the module, for example.

A wiring substrate 115 is coupled to the counter substrate SUB2. A detection IC 51 is mounted on the wiring substrate 115. The detection IC 51 includes a detection circuit 55 and receives supply of detection signals Vdet from detection electrodes Rx. The detection IC 51 can detect a detection target such as the input support device 3 and a finger Fg on the basis of the detection signals Vdet. Arrangement of the detection IC 51 is not limited thereto, and the detection IC 51 may be provided on a control substrate or a flexible substrate outside the module, for example.

Each of the wiring substrate 114 and the wiring substrate 115 is a flexible printed circuits (FPC) substrate, for example. The wiring substrate 114 is coupled to a plurality of terminals of the first substrate 10. The wiring substrate 115 is coupled to a plurality of terminals of the second substrate 20.

As illustrated in FIG. 1, a peripheral region BE is provided on the outer side of a display region DA in the display device 2. The display region DA is formed to have a square shape but the outer shape of the display region DA is not limited thereto. For example, the display region DA may have a substantially quadrangular shape with curved corners or may have a cutout. Alternatively, the display region DA may have another polygonal shape or another shape such as a circular shape and an elliptic shape.

The display region DA is a region for displaying an image and in which the pixels PX are provided. The peripheral region BE indicates a region on the inner side of the outer circumference of the array substrate SUB1 and on the outer side of the display region DA. The peripheral region BE may have a frame shape surrounding the display region DA, and in this case, the peripheral region BE can also be referred to as a frame region.

The input support device 3 is disposed (mounted) on the upper surface 111a of the cover member 111 for use. A user can perform an input operation on the display device 2 by operating the input support device 3 disposed on the display device 2. The input support device 3 is a rotary knob, for example, and has an annular shape in a plan view when viewed from the upper surface 111a of the display device 2. The display device 2 can detect a position of the input support device 3 in a plane and a rotation operation R centered on a rotation axis AX. In the first embodiment, the display region DA is a region in which a plurality of drive electrodes Tx and a plurality of detection electrodes Rx (refer to FIG. 5) are provided and serves also as a detection region.

As illustrated in FIG. 2, the input support device 3 includes a housing 30, a first electrode 31, a second electrode 32, and an LC circuit 35. The housing 30 is formed of an insulating resin material, for example, and is a hollow member having a space therein. The first electrode 31, the second electrode 32, and the LC circuit 35 are provided in the housing 30. The LC circuit 35 is an LC resonance circuit in which a capacitor 33 and an inductor 34 are coupled in parallel with each other. The first electrode 31 is coupled to one end side of the LC circuit 35 (the coupling portion of the capacitor 33 and one end of the inductor 34). The second electrode 32 is coupled to the other end side of the LC circuit 35 (the coupling portion of the capacitor 33 and the other end of the inductor 34). The display device 2 can detect positions of the first electrode 31 and the second electrode 32 using LC resonance of the LC circuit 35.

The housing 30 has an annular shape having a through hole in the region overlapping with the rotation axis AX. The housing 30, however, may have a circular shape having no through hole. In FIG. 2, the housing 30 is illustrated to have a shape having no through hole to illustrate the LC circuit 35 schematically.

FIG. 1 illustrates a plurality of input support devices 3A, 3B, and 3C as other examples of the input support device 3. The input support device 3A, which is a rotary knob, is formed in a tab shape having no through hole unlike the input support device 3. The input support device 3B, which is a slider, allows an input operation to be performed by displacing a tab thereof in a plane. The input support device 3B has a bar-like shape in a plan view. The input support device 3C is a button or an input key, and an input operation can be performed by touching the input support device 3C or performing a press-in operation thereon. The input detection system 1 is not limited to having all of the input support devices 3, 3A, 3B, and 3C. The input detection system 1 may have at least one of the input support devices 3, 3A, 3B, and 3C. The following explains the input support device 3. The explanation of the input support device 3 can be applied also to the other input support devices 3A, 3B, and 3C.

Figure 3:
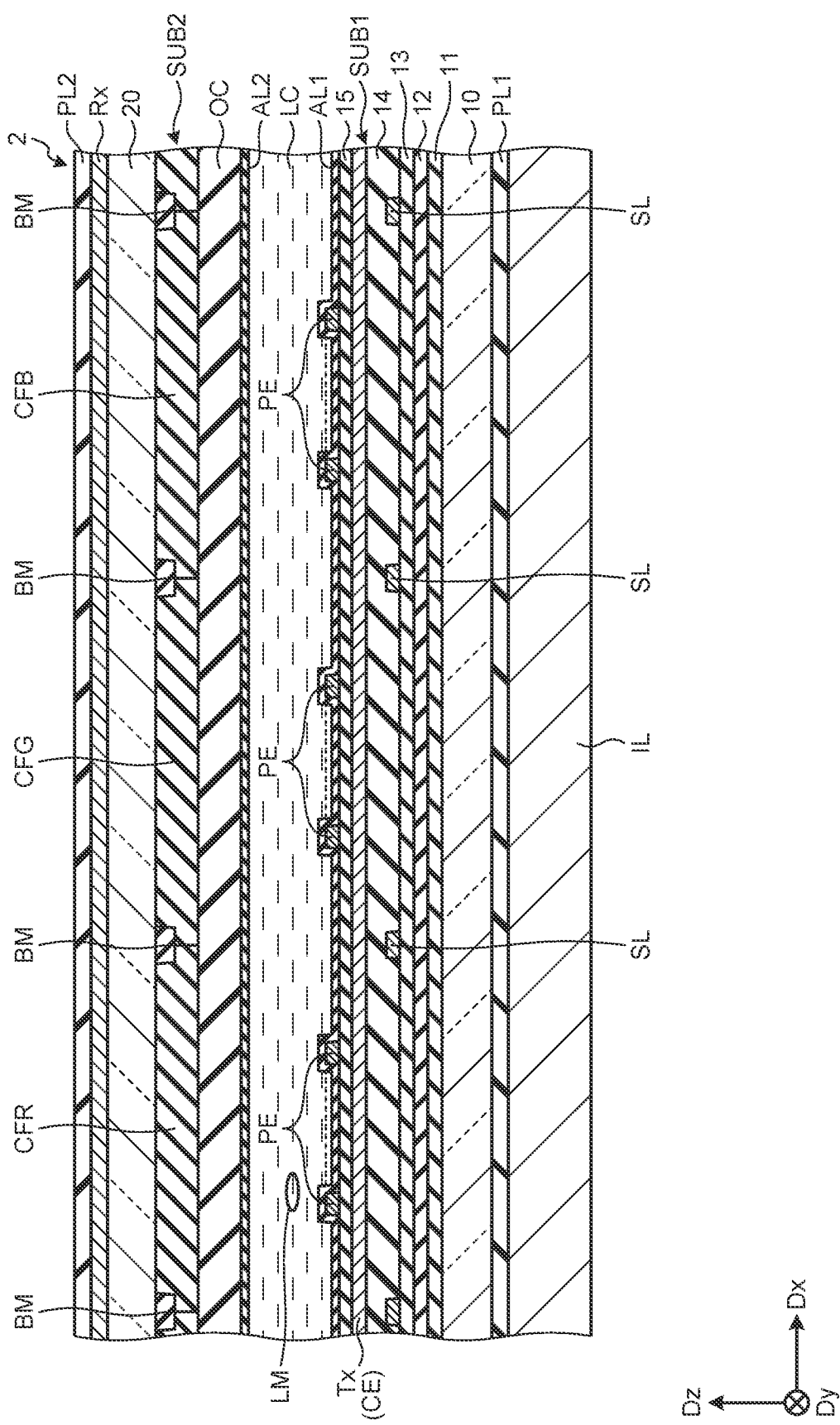
FIG. 3 is a cross-sectional view illustrating a schematic cross-sectional structure of a display device.

FIG. 3 is a cross-sectional view illustrating a schematic cross-sectional structure of the display device. FIG. 3 illustrates a cross-sectional view of a region A in FIG. 2, for example. As illustrated in FIG. 3, the display device 2 further includes a lighting device IL. The counter substrate SUB2 is disposed to face the array substrate SUB1 in a direction perpendicular to a surface of the array substrate SUB1. A liquid crystal layer LC is provided between the array substrate SUB1 and the counter substrate SUB2. The liquid crystal layer LC serving as a display function layer is provided between the first substrate 10 and the second substrate 20. The lighting device IL, the first polarizing plate PL1, the array substrate SUB1, the counter substrate SUB2, and the second polarizing plate PL2 are stacked in this order in the third direction Dz.

The array substrate SUB1 faces the lighting device IL while the counter substrate SUB2 is located on a side adjacent to the display surface. The lighting device IL emits light toward the array substrate SUB1. Applicable examples of the lighting device IL include a sidelight type backlight and a downlight type backlight. Various types of lighting devices IL can be applied, but their detailed structures are omitted from the explanation.

The optical element including the first polarizing plate PL1 faces the first substrate 10. More specifically, the first polarizing plate PL1 is disposed on the outer surface or the surface facing the lighting device IL of the first substrate 10. The optical element including the second polarizing plate PL2 faces the second substrate 20. More specifically, the second polarizing plate PL2 is disposed on the outer surface or on the surface on the observation position side of the second substrate 20. A first polarizing axis of the first polarizing plate PL1 and a second polarizing axis of the second polarizing plate PL2 are in relation of a crossed nicoles in the X-Y plane, for example. The optical element including the first polarizing plate PL1 and the optical element including the second polarizing plate PL2 may include other optical functional elements such as retardation plates.

The array substrate SUB1 includes insulating films 11, 12, 13, 14, 15, the pixel signal lines SL, pixel electrodes PE, the drive electrodes Tx (common electrodes CE), a first alignment film AL1, and the like on the side of the first substrate 10, the side facing the counter substrate SUB2.

In this specification, the direction from the first substrate 10 to the second substrate 20 in the direction perpendicular to the first substrate 10 is referred to as an "up side" or simply an "up". The direction from the second substrate 20 to the first substrate 10 is referred to as a "down side" or simply a "down". The term "plan view" refers to the positional relation when viewed from a direction perpendicular to the first substrate 10.

The insulating film 11 is provided on the first substrate 10. The insulating films 11, 12, 13, and 15 are inorganic insulating films formed of an inorganic material having a light transmitting property such as silicon oxide or silicon nitride, for example.

The insulating film 12 is provided on the insulating film 11. The insulating film 13 is provided on the insulating film 12. The pixel signal lines SL are provided on the insulating film 13. The insulating film 14 is provided on the insulating film 13 and covers the pixel signal lines SL. The insulating film 14 is formed of a resin material having a light transmitting property and has a thickness larger than those of other insulating films formed of inorganic materials. The scan lines GL, which are not illustrated in FIG. 3, are provided on the insulating film 12, for example.

The drive electrodes Tx are provided on the insulating film 14. The drive electrodes Tx are provided in the display region DA and are separated from one another by slits. The drive electrodes Tx are covered by the insulating film 15. The drive electrode Tx serves also as both drive electrode Tx for touch detection and the common electrode CE in display.

The pixel electrodes PE are provided on the insulating film 15 and face the drive electrodes Tx with the insulating film 15 therebetween. The pixel electrodes PE and the drive electrodes Tx are formed of a conductive material having a light transmitting property such as indium tin oxide (ITO) or indium zinc oxide (IZO), for example. The pixel electrodes PE and the insulating film 15 are covered by the first alignment film AL1.

The counter substrate SUB2 includes the light-shielding layer BM, color filters CFR, CFG, CFB, an overcoat layer OC, a second alignment film AL2, and the like on the side of the second substrate 20, the side facing the array substrate SUB1. The counter substrate SUB2 includes the detection electrodes Rx and the second polarizing plate PL2 on the side of the second substrate 20, the side being opposite the array substrate SUB1.

In the display region DA, the light-shielding layer BM is located on the side of the second substrate 20, the side facing the array substrate SUB1. The light-shielding layer BM defines the openings each facing one of the pixel electrodes PE. The pixel electrodes PE are separated from one another such that each pixel electrode PE corresponds to the opening of one of the pixels PX. The light-shielding layer BM is formed of a black resin material or a metallic material having a light-shielding property.

The color filters CFR, CFG, and CFB are each located on the side of the second substrate 20, the side facing the array substrate SUB1, and their edges overlap with the light-shielding layer BM. For example, the color filters CFR, CFG, and CFB are formed of resin materials colored in red, green, and blue, respectively.

The overcoat layer OC covers the color filters CFR, CFG, and CFB. The overcoat layer OC is formed of a resin material having a light transmitting property. The second alignment film AL2 covers the overcoat layer OC. The first alignment film AL1 and the second alignment film AL2 are formed of a material that exhibits a horizontal alignment property, for example.

The detection electrodes Rx provided on the second substrate 20. The detection electrode Rx is a metal wiring line formed of a conductive material, for example. The detection electrode Rx may be a conductive material having a light transmitting property such as ITO, for example.

The array substrate SUB1 and the counter substrate SUB2 are arranged such that the first alignment film AL1 and the second alignment film AL2 face each other. The liquid crystal layer LC is sealed between the first alignment film AL1 and the second alignment film AL2. The liquid crystal layer LC contains a negative liquid crystal material having a negative dielectric anisotropy or a positive liquid crystal material having a positive dielectric anisotropy.

For example, when the liquid crystal layer LC is a negative liquid crystal material and no voltage is applied to the liquid crystal layer LC, liquid crystal molecules LM are initially oriented in the X-Y plane such that their long axes are along the first direction Dx. When a voltage is applied to the liquid crystal layer LC, i.e., at an on state at which an electric field is formed between the pixel electrode PE and the drive electrode Tx, the liquid crystal molecules LM change their orientation states under the influence of the electric field. At the on state, incident linearly polarized light changes its polarization state in accordance with the orientation state of the liquid crystal molecules LM when it passes through the liquid crystal layer LC.

Figure 4:
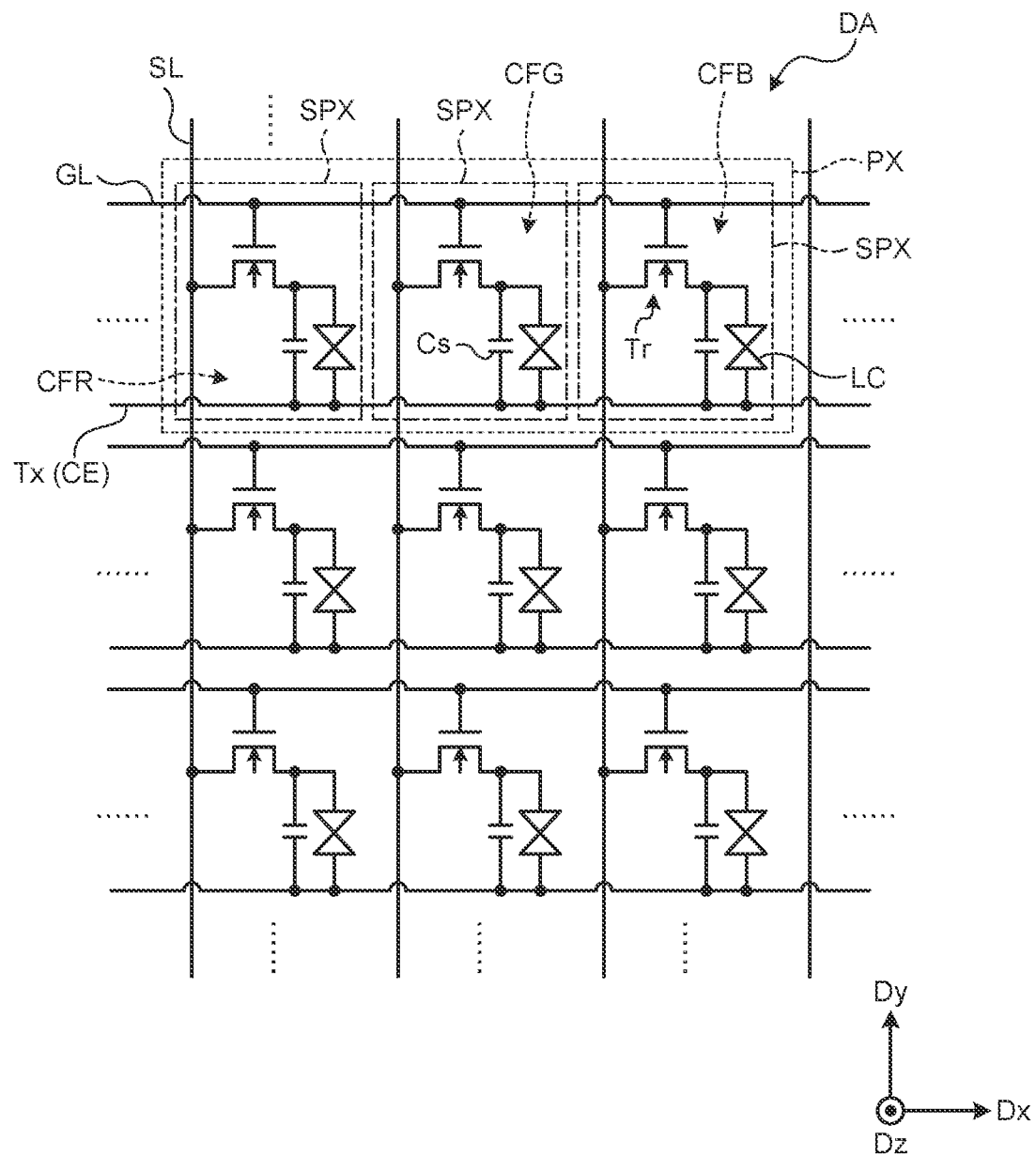
FIG. 4 is a circuit diagram illustrating a pixel array in a display region.

FIG. 4 is a circuit diagram illustrating a pixel array in the display region. The switching elements Tr each included in one of sub-pixels SPX, the pixel signal lines SL, the scan lines GL, and the like that are illustrated in FIG. 4 are formed in the array substrate SUB1. The pixel signal lines SL extend in the second direction Dy. The pixel signal lines SL are wiring lines that supply a pixel signal VSG to each pixel electrode PE (refer to FIG. 3). The scan lines GL extend in the first direction Dx. The scan lines GL are wiring lines that supply a drive signal (a scan signal VGL) driving each switching element Tr.

The pixel PX includes multiple sub-pixels SPX. Each sub-pixel SPX has the switching element Tr and a capacitance of the liquid crystal layer LC. The switching element Tr is a thin-film transistor. In this example, the switching element Tr is an n-channel metal oxide semiconductor (MOS) type TFT. The insulating film 15 is provided between the pixel electrodes PE and the drive electrodes Tx illustrated in FIG. 3, resulting in holding capacitances Cs illustrated in FIG. 4 being formed.

In the color filters CFR, CFG, and CFB, color regions colored in three colors of red (R), green (G), and blue (B) are periodically arrayed, for example. Each of the color regions colored in three colors of R, G, and B corresponds to one of the sub-pixels SPX to be a set. As a result, the pixel PX is composed of a set of sub-pixels SPX corresponding to the three color regions. The color filters may correspond to four or more of color regions. In this case, the pixel PX may include four or more of sub-pixels SPX.

Figure 5:
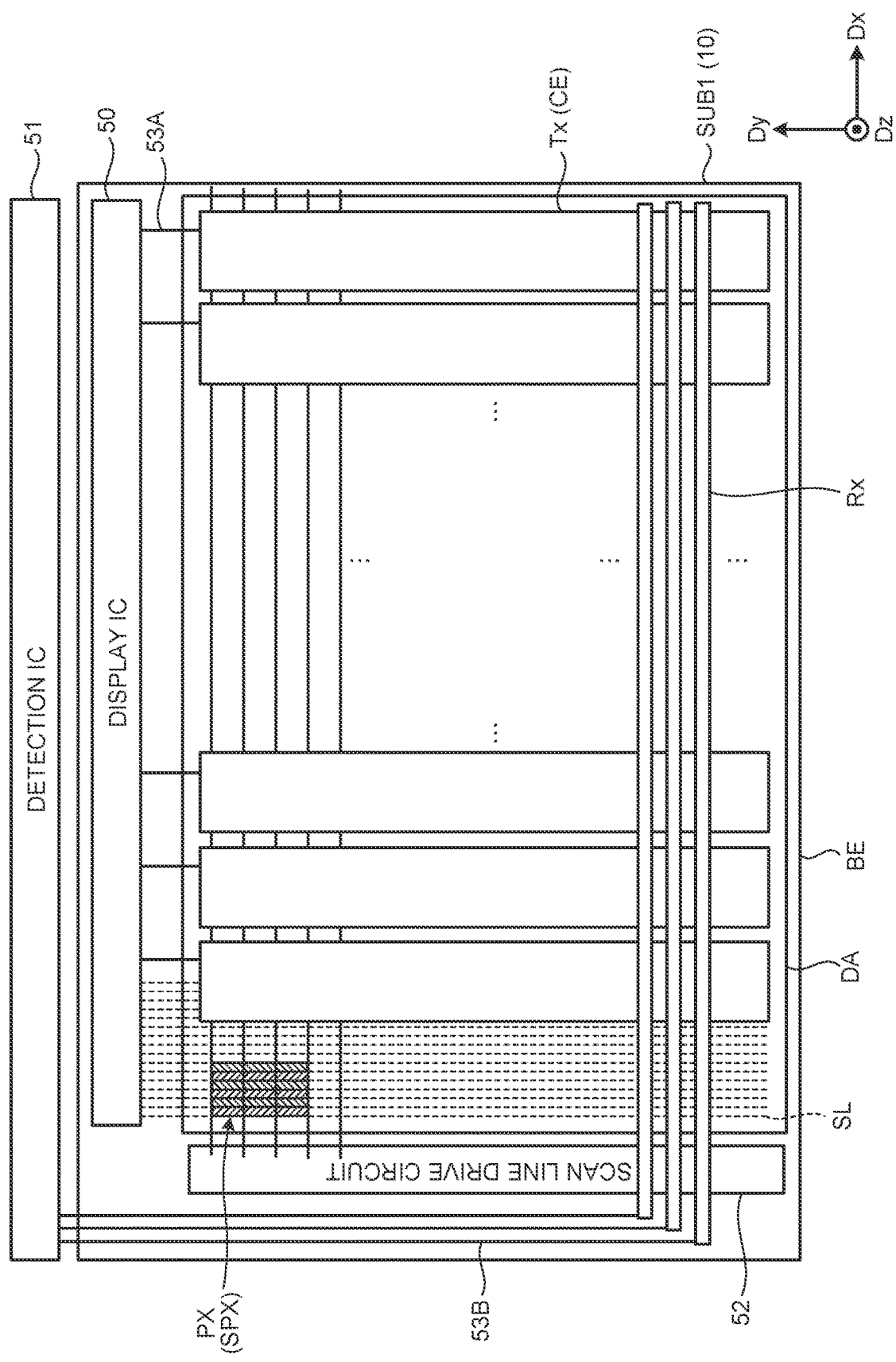
FIG. 5 is a plan view schematically illustrating an array substrate included in the display device.

FIG. 5 is a plan view schematically illustrating the array substrate included in the display device. FIG. 5 schematically illustrates a part of the detection electrodes Rx provided on the counter substrate SUB2 in order to explain the relation between the drive electrodes Tx and the detection electrodes Rx. As illustrated in FIG. 5, the pixels PX (sub pixels SPX) are arrayed in a matrix with a row-column configuration in the display region DA. The pixel signal lines SL and the scan lines GL are provided to correspond to the pixel electrodes PE included in the sub-pixels SPX. The pixel signal lines SL are coupled to the control circuit such as the display IC 50 provided in the peripheral region BE. A scan line drive circuit 52 is provided in a region extending along the second direction Dy in the peripheral region BE.

The scan lines GL are coupled to the scan line drive circuit 52. The scan line drive circuit 52 supplies the scan signal VGL for driving the switching element Tr of each pixel PX (each sub pixel SPX) to the scan lines GL.

The drive electrodes Tx extend in the second direction Dy and are arrayed in the first direction Dx. The drive electrodes Tx are each coupled to the display IC 50 through a coupling wiring line 53A. The detection electrodes Rx extend in the first direction Dx and are arrayed in the second direction Dy. The detection electrodes Rx are each coupled to the detection IC 51 through a coupling wiring line 53B. The drive electrodes Tx and the detection electrodes Rx are provided so as to intersect with each other in a plan view. An electrostatic capacitance is formed in each of intersections of the drive electrodes Tx and the detection electrodes Rx. The detection IC 51 can detect the detection target on the basis of the detection signals Vdet that are output in accordance with change in the mutual electrostatic capacitances between the drive electrodes Tx and the detection electrodes Rx.

FIG. 5 illustrates only some drive electrodes Tx, some detection electrodes Rx, and some pixels PX (the sub pixels SPX) for easier viewing. The drive electrodes Tx, the detection electrodes Rx, and the pixels PX are, however, arranged in the entire display region DA. The pixels PX are arranged to overlap with one drive electrode Tx. One drive electrode Tx is disposed to overlap with the pixel signal lines SL.

The detection electrode Tx serves as both common electrode CE in display and drive electrode Tx for detecting the detection target such as the finger Fg, the input support device 3, or the like. Specifically, the display IC 50 supplies a display drive signal VCOM to the drive electrodes Tx in display. In touch detection, which detects the position of the finger Fg, the display IC 50 supplies a detection drive signal VD to the drive electrodes Tx. The detection signals Vdet based on change in mutual electrostatic capacitances are output to the detection IC 51. As a result, the detection IC 51 detects the contact or proximity of the finger Fg. In input support device detection, which detects the input support device 3, the display IC 50 supplies the detection drive signal VD to the drive electrodes Tx, and the detection IC 51 detects the position and the like of the input support device 3 utilizing a change in the mutual electrostatic capacitance and resonance of the LC circuit 35 of the input support device 3.

Figure 6:
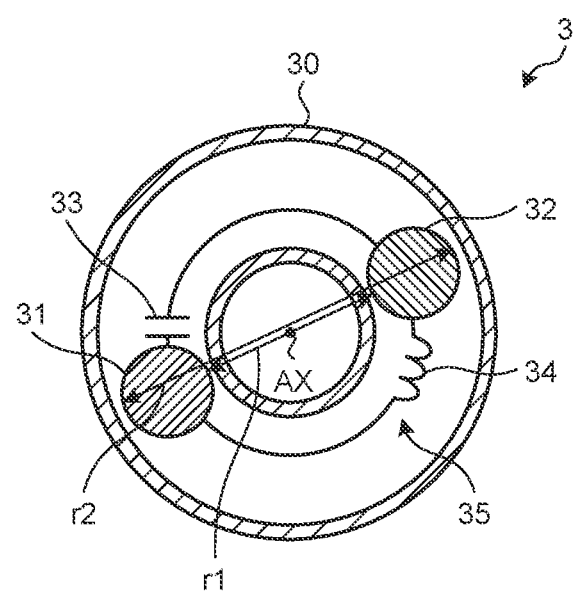
FIG. 6 is a cross-sectional view cut along line VI-VI' in FIG. 2.

FIG. 6 is a cross-sectional view cut along line VI-VI' in FIG. 2. FIG. 6 schematically illustrates a cross-sectional view of the input support device 3 cut along a plane parallel to the upper surface 111a (refer to FIG. 1). As illustrated in FIG. 6, the input support device 3 has a circular shape in a plan view. The first electrode 31 and the second electrode 32 are arranged on the opposite sides across the rotation axis AX in a plan view. The first electrode 31 and the second electrode 32 each have a circular shape in a plan view. The shapes of the first electrode 31 and the second electrode 32 are not limited thereto, and may be other shapes such as square shapes and polygonal shapes. The first electrode 31 and the second electrode 32 may have different shapes. In the following explanation, the shortest distance between the first electrode 31 and the second electrode 32 is referred to as a first distance r1. The most distant distance between the first electrode 31 and the second electrode 32 is referred to as a second distance r2.

FIG. 6 equivalently illustrates the capacitor 33 and the inductor 34 that are included in the LC circuit 35. The LC circuit 35 may be formed by integrated circuit components mounted on a substrate, for example. It is sufficient that the capacitor 33 and the inductor 34 are coupled electrically in parallel between the first electrode 31 and the second electrode 32, and arrangement thereof in the housing 30 may be desirably set.

Figure 7:
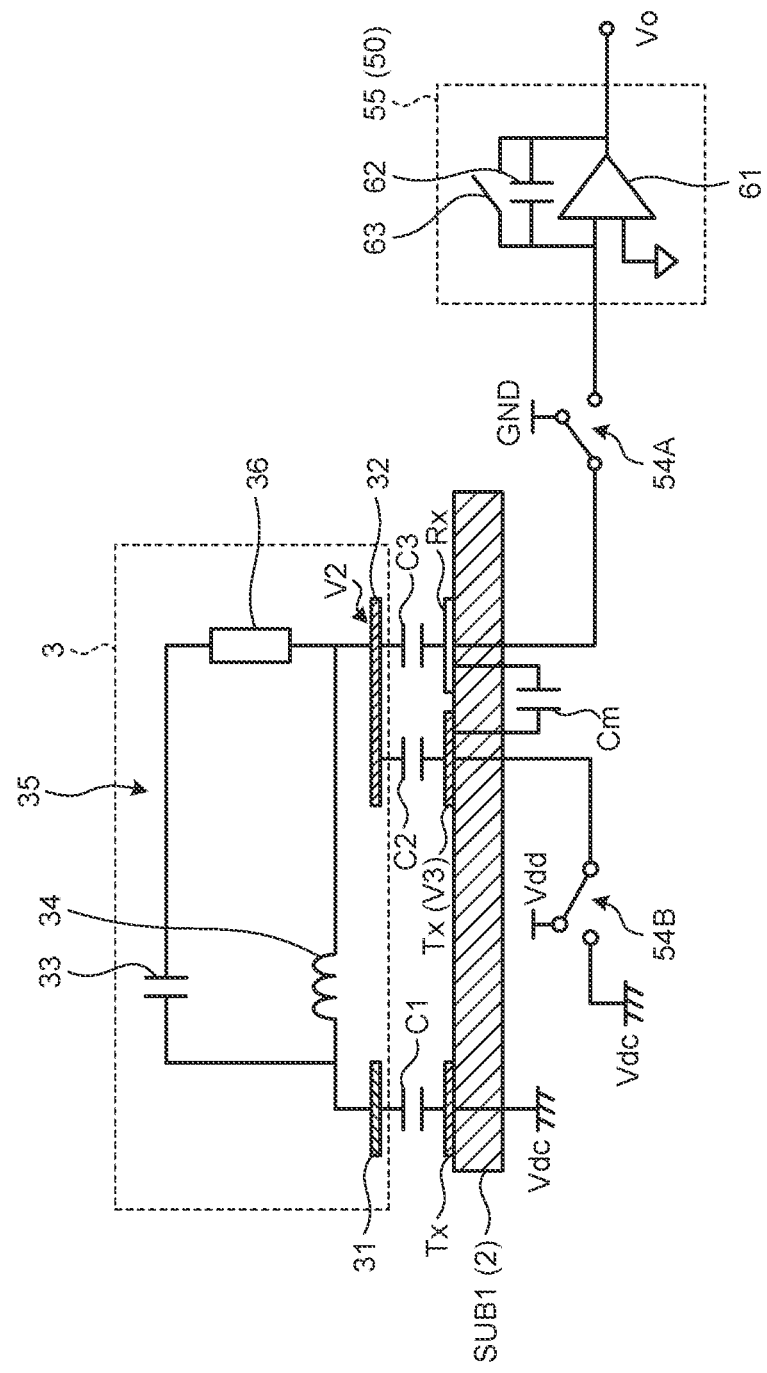
FIG. 7 is a descriptive view for explaining a method for detecting an input support device.
Figure 8:
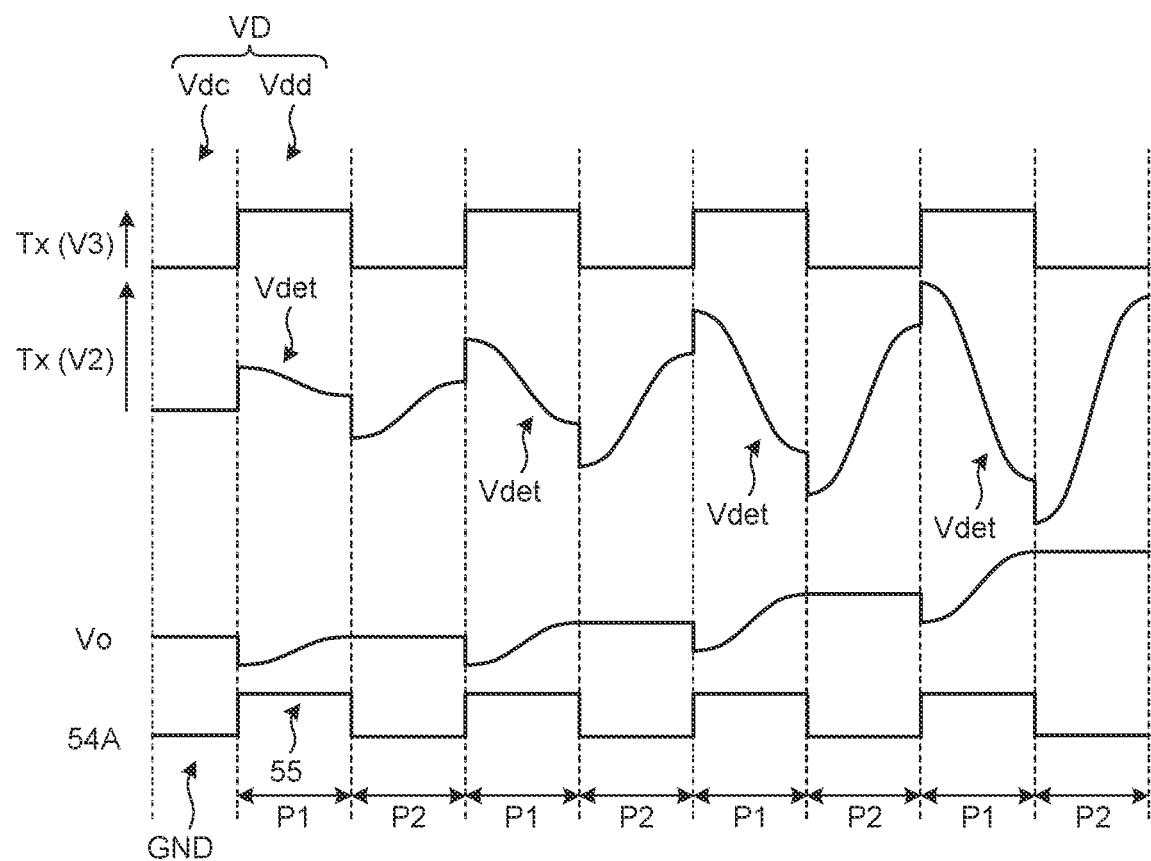
FIG. 8 is a timing waveform chart for explaining the method for detecting the input support device.

FIG. 7 is a descriptive view for explaining a method for detecting the input support device. FIG. 8 is a timing waveform chart for explaining the method for detecting the input support device. As illustrated in FIG. 7, the first electrode 31 of the input support device 3 is disposed to face the drive electrode Tx in the array substrate SUB1, and the second electrode 32 of the input support device 3 is disposed to face the detection electrode Rx in the counter substrate SUB2. In FIG. 7, the drive electrode Tx and the detection electrode Rx are schematically illustrated on the same substrate. The detection electrode Rx facing the first electrode 31 is omitted.

A capacitance C1 is formed between the first electrode 31 and one drive electrode Tx. The one drive electrode Tx is coupled to a reference potential (e.g., a reference potential Vdc). A capacitance C2 is formed between the second electrode 32 and the other drive electrode Tx. The other drive electrode Tx is coupled to a power supply potential Vdd or the reference potential (e.g., the reference potential Vdc) via a switch element 54B.

A capacitance C3 is formed between the second electrode 32 and the detection electrode Rx. The detection electrode Rx is coupled to the detection circuit 55 or the reference potential (e.g., a ground potential GND) via a switch element 54A. A mutual electrostatic capacitance Cm is formed between the drive electrode Tx and the detection electrode Rx.

The detection circuit 55, which is a signal processing circuit provided in the display IC 50, receives the detection signal Vdet (refer to FIG. 8) output from the detection electrode Rx, performs predetermined signal processing thereon, and outputs an output signal Vo. The detection circuit 55 includes a detection signal amplifier 61, a capacitive element 62, and a reset switch 63. The detection circuit 55 is not limited thereto and may further include an A/D conversion circuit (not illustrated) that converts an analog signal output from the detection signal amplifier 61 into a digital signal. In FIG. 7, the LC circuit 35 of the input support device 3 has a resistive element 36 coupled in series with the capacitor 33. The resistive element 36, however, may not be included.

As illustrated in FIGS. 7 and 8, the detection drive signal VD of alternate rectangular waves is supplied to the other drive electrode Tx by an operation of the switch element 54B. The detection drive signal VD alternates between the power supply potential Vdd, i.e., a high level potential, and the reference potential Vdc, i.e., a low level potential, at a predetermined frequency. A potential V3 of the other drive electrode Tx varies in accordance with the detection drive signal VD. Periods that are repeated in synchronization with the detection drive signal VD are a first period P1 and a second period P2. The first period P1 is the period during which the other drive electrode Tx is coupled to the power supply potential Vdd. The second period P2 is the period during which the other drive electrode Tx is coupled to the reference potential Vdc. The power supply potential Vdd is higher than the reference potential Vdc, for example.

The detection electrode Rx outputs the detection signal Vdet on the basis of the mutual electrostatic capacitance Cm. Specifically, as described above, the one drive electrode Tx is coupled to the reference potential (e.g., the reference potential Vdc). As a result, during the first period P1, signals with different potentials are thereby supplied to the first electrode 31 and the second electrode 32. The detection electrode Rx is coupled to the detection circuit 55 by the switching operation of the switch element 54A in the first period P1. This results in a change in potential V2 based on the mutual electrostatic capacitance Cm being output, as the detection signals Vdet, to the detection circuit 55 from the detection electrode Rx.

The detection signal amplifier 61 of the detection circuit 55 amplifies the detection signal Vdet supplied from the detection electrode Rx. The reference voltage having a fixed potential is input into the non-inverting input of the detection signal amplifier 61 while the detection electrode Rx is coupled to the inverting input terminal. In the first embodiment, the same signal as that coupled to the one drive electrode Tx is input as the reference voltage. The detection circuit 55 can reset charges in the capacitive element 62 by turning the reset switch 63 on.

The detection drive signal VD has the frequency same as the resonant frequency of the LC circuit 35. The second electrode 32 overlapping with the other drive electrode Tx is also driven at the resonant frequency. As a result, the LC circuit 35 resonances. The amplitude of the detection signal Vdet is thus increased as the first period P1 and the second period P2 are repeated. As illustrated in FIG. 8, the amplitude of the detection signal Vdet output in the first period P1 is increased and the potential of the output signal Vo from the detection circuit 55 varies to be increased as the first period P1 is repeated a plurality of number of times.

When the detection target different from the input support device 3, such as the finger Fg, comes into contact with or close to the upper surface 111a (refer to FIG. 1), the detection signal Vdet varies in accordance with a change in the mutual electrostatic capacitance Cm. When the detection target is the finger Fg, for example, no resonance is generated. As a result, a temporal change in the amplitude of the detection signal Vdet as illustrated in FIG. 8 does not occur. The input detection system 1 can thus determine whether the detection target is the finger Fg or the input support device 3 using the LC resonance of the LC circuit 35.

Figure 9:
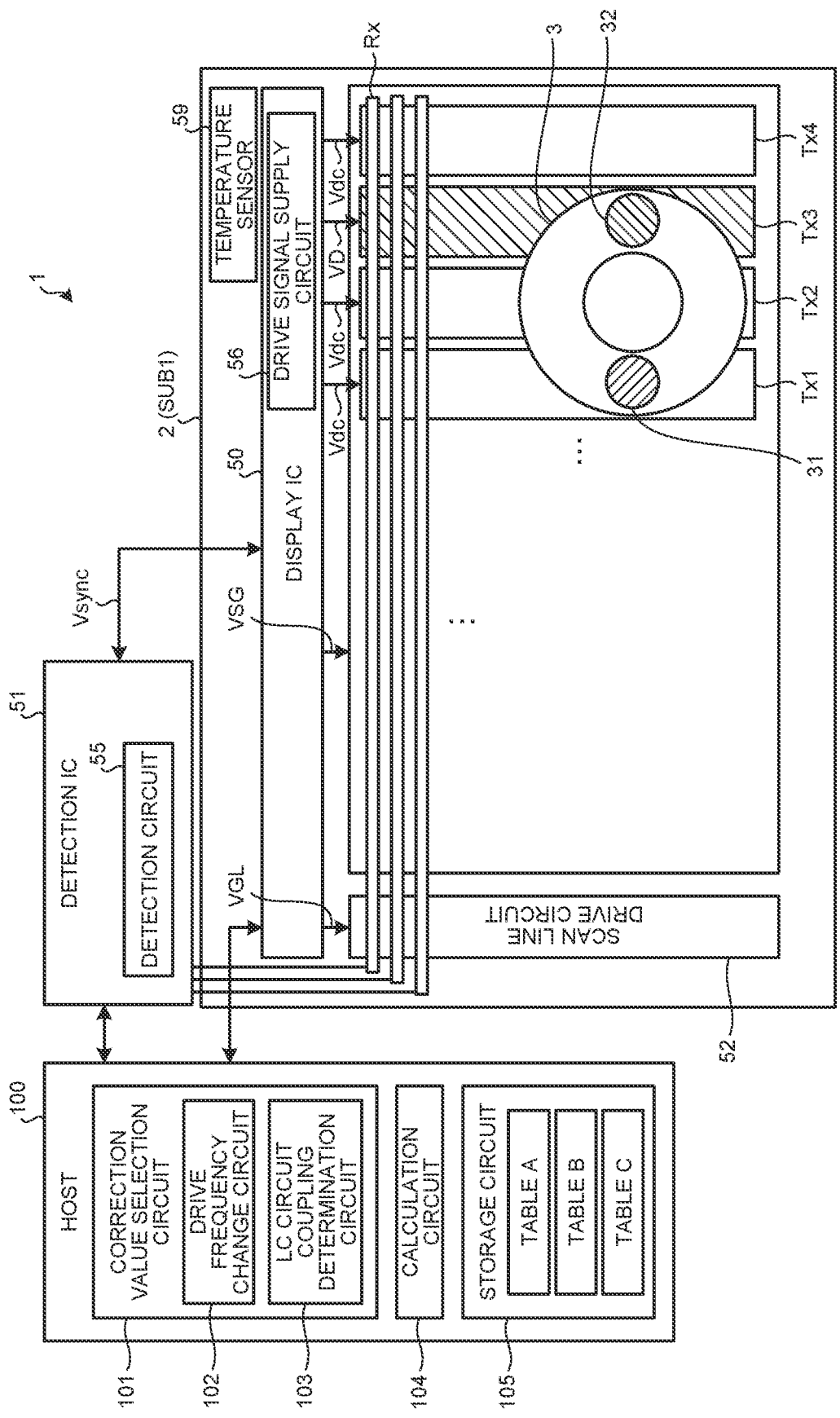
FIG. 9 is a block diagram schematically illustrating the array substrate, the input support device, and ICs.

FIG. 9 is a block diagram schematically illustrating the array substrate and the control ICs. As illustrated in FIG. 9, the display IC 50 includes at least a drive signal supply circuit 56. The drive signal supply circuit 56 supplies detection drive signal VD sequentially to the drive electrodes Tx. In FIG. 9, the drive electrode Tx to which the detection drive signal VD is supplied is illustrated with hatching. For example, in FIG. 9, the drive signal supply circuit 56 supplies the detection drive signal VD to a drive electrode Tx3, and supplies the reference potential Vdc to drive electrodes Tx1, Tx2 and Tx4, which are not selected. The drive signal supply circuit 56 includes the switch element 54B, the power supply potential Vdd, and the reference potential Vdc, for example. The display IC 50 further includes a circuit that supplies the scan signal VGL to the scan line drive circuit 52, and a circuit that supplies the pixel signal VSG to each pixel PX, these circuits being omitted in FIG. 9.

The detection IC 51 is controlled to operate in synchronization with the display IC 50 on the basis of a control signal Vsync.

The input detection system 1 further includes a temperature sensor 59. The temperature sensor 59 is provided on the array substrate SUB1. The temperature sensor 59, however, may be provided outside the display device 2.

The host IC 100 is a circuit that controls the display device 2. The host IC 100 includes a correction value selection circuit 101, a calculation circuit 104, and a storage circuit 105. The correction value selection circuit 101 includes a drive frequency change circuit 102 and an LC circuit coupling determination circuit 103. The drive frequency change circuit 102 selects a correction value for a drive frequency f-vd of the detection drive signal VD on the basis of the detection value of the detection signal Vdet and information in a table included in the storage circuit 105. The LC circuit coupling determination circuit 103 determines a coupling status, such as whether the LC circuit 35 of the input support device 3 is coupled, on the basis of the detection value of the detection signal Vdet and the information in the table included in the storage circuit 105. The temperature sensor 59 and the LC circuit coupling determination circuit 103 may not be provided.

The calculation circuit 104 receives the output voltages Vo from the detection circuit 55 and calculates the position (coordinates) of the detection target. The calculation circuit 104 compares a detection pattern of the detection target with the information from the storage circuit 105 to determine which detection target such as the finger Fg, the input support device 3, or the like, is detected. The host IC 100 outputs a command to the display device 2 to cause the display device 2 to perform the operation according to the input operation in accordance with the information about the type of the detection target from the calculation circuit 104. The calculation circuit 104 may be included in the detection IC 51.

The storage circuit 105 stores therein tables A, B, and C having information about the correction value of the drive frequency f-vd of the detection drive signal VD. The tables A, B, and C have information indicating a relation between the drive frequency f-vd and the detected value and a relation between the drive frequency f-vd and a temperature, for example. The storage circuit 105 further stores therein information about a detection pattern of each of the finger Fg and the input support devices 3, 3A, 3B, and 3C in a table form.

The following explains an arrangement relation between the input support device 3 and the drive electrodes Tx. As illustrated in FIG. 9, the input support device 3 is disposed to overlap with some of the drive electrodes Tx and some of the detection electrodes Rx. The first electrode 31 is disposed to overlap with at least one (e.g., the drive electrode Tx1) of the drive electrodes Tx. The second electrode 32 is disposed to overlap with the drive electrode Tx (e.g., the drive electrode Tx3) different from the drive electrode Tx with which the first electrode 31 overlaps.

The width of the drive electrode Tx is smaller than the first distance r1 and the second distance r2 (refer to FIG. 6) between the first electrode 31 and the second electrode 32. The drive signal supply circuit 56 may supply the detection drive signal VD to a plurality of the adjacent drive electrodes Tx and drive a drive electrode block composed of the adjacent drive electrodes Tx at the same time. The width of the drive electrode block is smaller than the first distance r1 and the second distance r2 (refer to FIG. 6) between the first electrode 31 and the second electrode 32.

As a result, when the input support device 3 is disposed to overlap with some of the drive electrodes Tx, the reference potential Vdc is supplied to the drive electrode Tx overlapping with the first electrode 31 (the drive electrode Tx1) while the detection drive signal VD is supplied to the drive electrode Tx overlapping with the second electrode 32 (the drive electrode Tx3). The second electrode 32, thus, can increase the amplitude of the detection signal Vdet using the resonance of the LC circuit 35.

Figure 10:
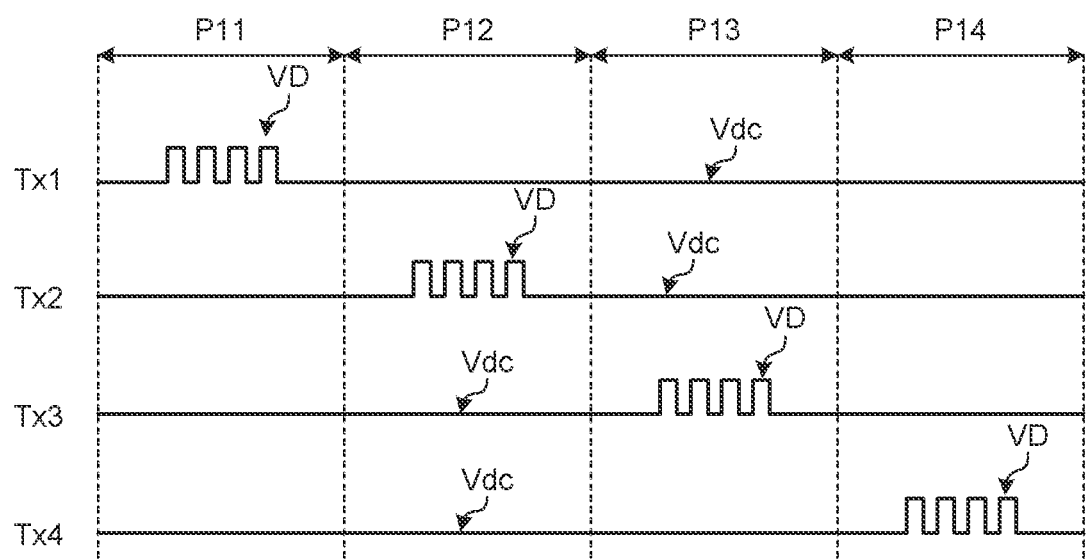
FIG. 10 is a timing waveform chart of a plurality of drive electrodes.

FIG. 10 is a timing waveform chart of the drive electrodes. As illustrated in FIG. 10, in the first period P11, the display IC 50 supplies the detection drive signal VD to the drive electrode Tx1. The display IC 50 supplies the reference potential Vdc to the drive electrodes Tx2, Tx3, and Tx4 other than the drive electrode Tx1.

In the second period P12, the display IC 50 supplies the detection drive signal VD to the drive electrode Tx2. The display IC 50 supplies the reference potential Vdc to the drive electrodes Tx1, Tx3, and Tx4 other than the drive electrode Tx2.

In the third period P13 and the fourth period P14, the display IC 50 supplies the detection drive signal VD sequentially to the drive electrodes Tx3 and Tx4. The display IC 50 supplies the reference potential Vdc to the unselected drive electrodes Tx.

In this way, the input detection system 1 can detect the position of the input support device 3 and the rotational operation R by sequentially scanning the drive electrodes Tx to which the detection drive signal VD is supplied.

Figure 11:
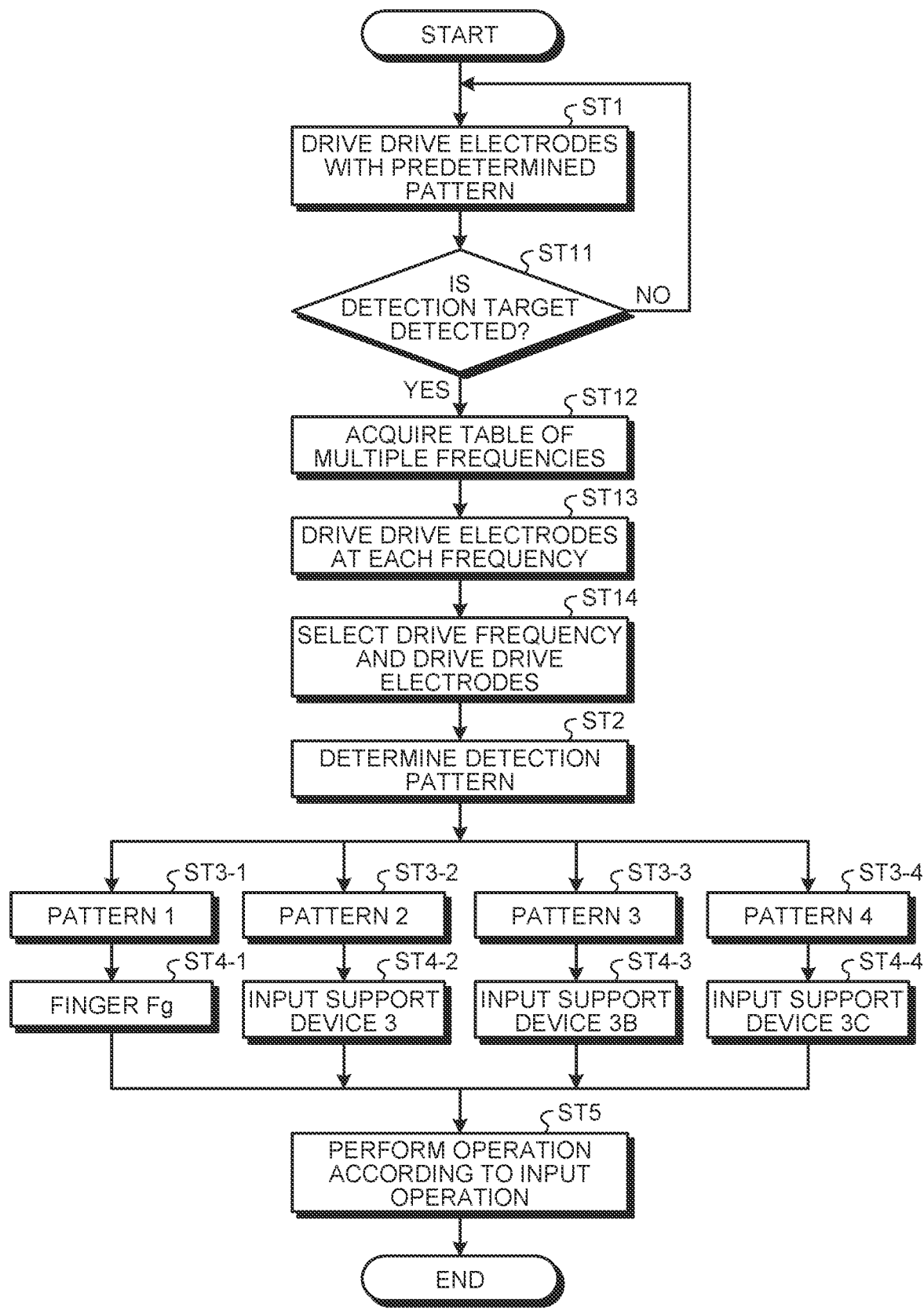
FIG. 11 is a flowchart for explaining a method for correcting a drive frequency.
Figure 12:
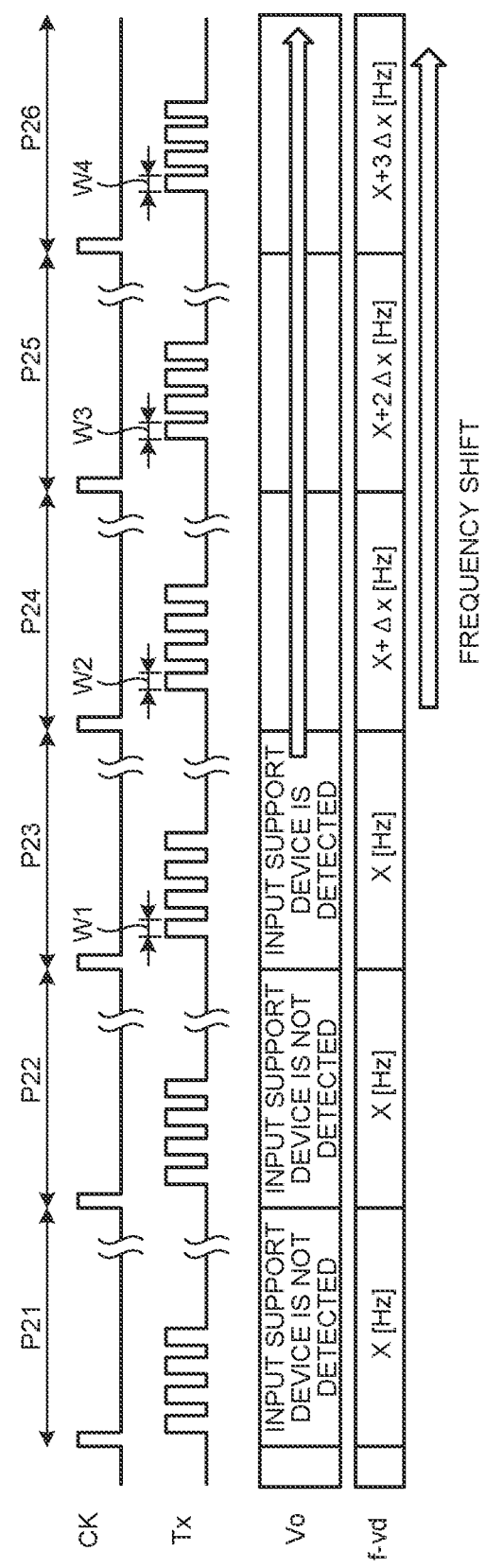
FIG. 12 is a descriptive view for explaining the method for correcting the drive frequency.
Figure 13:
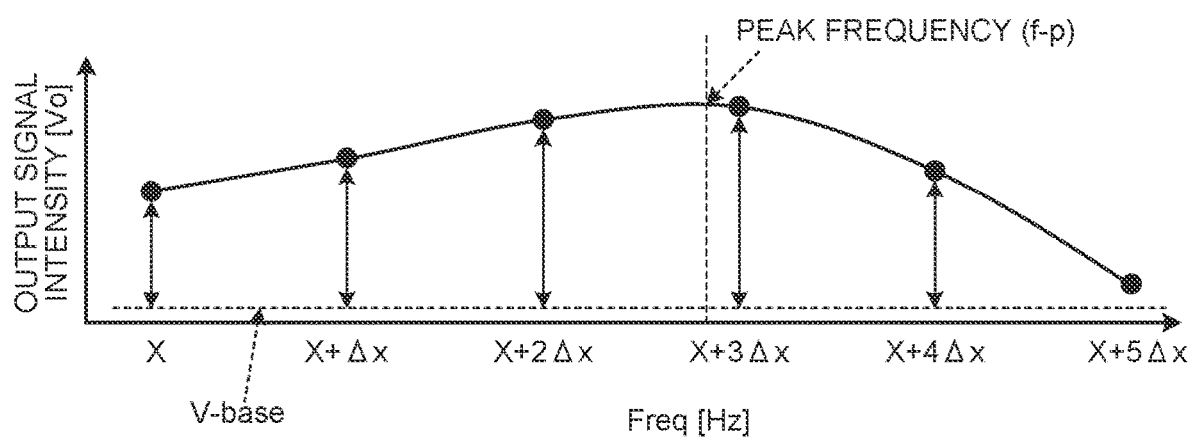
FIG. 13 is a graph schematically illustrating a relation between the drive frequency and a detection value of a detection signal.

The following explains a method for correcting the drive frequency f-vd of the detection drive signal VD in the input detection system 1 with reference to FIG. 9 and FIGS. 11 to 13. FIG. 11 is a flowchart for explaining the method for correcting the drive frequency. FIG. 12 is a descriptive view for explaining the method for correcting the drive frequency. FIG. 13 is a graph schematically illustrating a relation between the drive frequency and the detection value of the detection signal.

As illustrated in FIGS. 11 and 12, the display IC 50 drives the drive electrodes Tx with a predetermined pattern (step ST1). Specifically, as illustrated in FIG. 12, the display IC 50 supplies the detection drive signal VD sequentially to the drive electrodes Tx for each of the periods P21, P22, and P23 on the basis of a control signal CK. Each of the periods P21, P22, P23, and so on is a detection frame, i.e., a period in which the detection drive signal VD is supplied sequentially to all of the drive electrodes Tx arranged in the display region DA. The drive manner is not limited to this example. A plurality of detection frames may be driven for each of the periods P21, P22, P23, and so on.

The drive frequency f-vd of the detection drive signal VD in the periods P21 and P22 is X (Hz). The drive frequency X (Hz) is the resonance frequency of the LC circuit 35 of the input support device 3 at a reference temperature (e.g., 25° C.) and is preliminarily stored in the storage circuit 105 as a setting value. The drive frequency f-vd is the frequency of each pulse of the detection drive signal VD. Each of the pulse widths W1, W2, W3, and W4, and the period of each of the pulses differ according to change in the frequency of the detection drive signal VD.

The input detection system 1 determines whether the detection target is detected on the basis of the detection signal Vdet (step ST11). If no detection target is detected (No at step ST11), the display IC 50 repeatedly drives the drive electrodes Tx. For example, it is determined that the detection target is present when the intensity (detection value) of the output signal Vo is equal to or larger than, by a predetermined value, the intensity (baseline) of the output signal Vo in a case where the input support device 3 or the finger Fg is not in contact with the upper surface 111a. The drive electrodes Tx are driven at the drive frequency having a frequency that can determine the presence or absence of the detection target even taking into account errors and the operating temperature range. As for the baseline (V-Base), which is the intensity of the output signal Vo when the input support device 3 or the finger Fg is not in contact with the upper surface 111a, the detection value measured with no detection target placed on the touch panel sensor at the time of product shipment can be stored in a table as the baseline (V-Base). The value detected immediately after power-on may be stored in a table as the baseline (V-Base). When a value in a predetermined value range continues for a predetermined number of detection periods in use of the product, the value may be used as the baseline (V-Base).

For example, if the detection target is detected in the period P23 (Yes at step ST11), the drive frequency change circuit 102 acquires a table of a plurality of frequencies from the storage circuit 105 (step ST12). In the first embodiment, the storage circuit 105 stores therein the table of multiple frequencies as information about the correction value of the drive frequency f-vd of the detection drive signal VD. The table of the frequencies includes values such as X (Hz), X+Δx (Hz), X+2Δx, X+3Δx, and the like for the drive frequency f-vd.

The drive frequency change circuit 102 supplies the information about the drive frequency f-vd to the drive signal supply circuit 56. The drive signal supply circuit 56 drives the drive electrodes Tx at each frequency (step ST13). Specifically, in the period P24, the drive signal supply circuit 56 supplies the detection drive signal VD having a drive frequency f-vd of X+Δx (Hz) to the drive electrodes Tx sequentially. In the period P25, the drive signal supply circuit 56 supplies the detection drive signal VD having a drive frequency f-vd of X+2Δx (Hz) to the drive electrodes Tx sequentially. In the period P26, the drive signal supply circuit 56 supplies the detection drive signal VD having a drive frequency f-vd of X+3Δx (Hz) to the drive electrodes Tx sequentially.

As illustrated in FIG. 13, the calculation circuit 104 calculates the frequency (a peak frequency f-p) at which the intensity (detection value) of the output signal Vo is the maximum value from a relation between the drive frequency and the intensity (detection value) of the output signal Vo. The peak frequency f-p is the frequency that matches the resonance frequency of the LC circuit 35 of the input support device 3. The drive frequency change circuit 102 corrects the drive frequency f-vd into the frequency that indicates the maximum detection value (the peak frequency f-p) on the basis of the relation between each detection value obtained by frequency shift drive and the drive frequencies f-vd. The drive signal supply circuit 56 drives the drive electrodes Tx with the detection drive signal VD having a drive frequency f-vd (of the peak frequency f-p) corrected on the basis of the information from the correction value selection circuit 101 (step ST14).

The display IC 50 drives the drive electrodes Tx in a predetermined pattern with the detection drive signal VD having a corrected drive frequency f-vd. The detection circuit 55 detects the detection signal Vdet based on a change in the mutual electrostatic capacitance Cm. The host IC 100 (refer to FIG. 9) receives the output voltages Vo from the detection IC 51 and performs the predetermined calculation processing. The calculation circuit 104 compares the detection pattern of the calculation result with the information in the storage circuit 105 to determine the detection pattern (step ST2). The detection pattern may be the shape of the detection target such as the finger Fg, the input support device 3, or the like, or the detection intensity according to the shape or the like. The type of the non-detection target is determined according to the detection pattern.

For example, the calculation circuit 104 compares the detection pattern from the detection IC 51 with the information about pattern 1 stored in the storage circuit 105 (step ST3-1). If it is determined that both patterns are identical or similar, the calculation circuit 104 determines that the detection target is the finger Fg (step ST4-1).

The calculation circuit 104 compares the detection pattern from the detection IC 51 with the information about pattern 2 stored in the storage circuit 105 (step ST3-2). If it is determined that both patterns are identical or similar, the calculation circuit 104 determines that the detection target is the input support device 3 (step ST4-2).

The calculation circuit 104 compares the detection pattern from the detection IC 51 with the information about pattern 3 stored in the storage circuit 105 (step ST3-3). If it is determined that both patterns are identical or similar, the calculation circuit 104 determines that the detection target is the slider (the input support device 3B) (step ST4-3).

The calculation circuit 104 compares the detection pattern from the detection IC 51 with the information about pattern 4 stored in the storage circuit 105 (step ST3-4). If it is determined that both patterns are identical or similar, the calculation circuit 104 determines that the detection target is the button (the input support device 3C) (step ST4-4).

The host IC 100 outputs a command to the display IC 50 to perform the operation according to the input operation on the basis of the information about the type of the detection target, input position information, and the like. This causes the display device 2 to perform the operation according to the input operation (step ST5).

The flowchart illustrated in FIG. 11 is only an example and may be appropriately modified. The correction of the drive frequency f-vd illustrated in FIG. 11 may be performed at regular intervals or at the time of product shipment or system startup.

Figure 14:
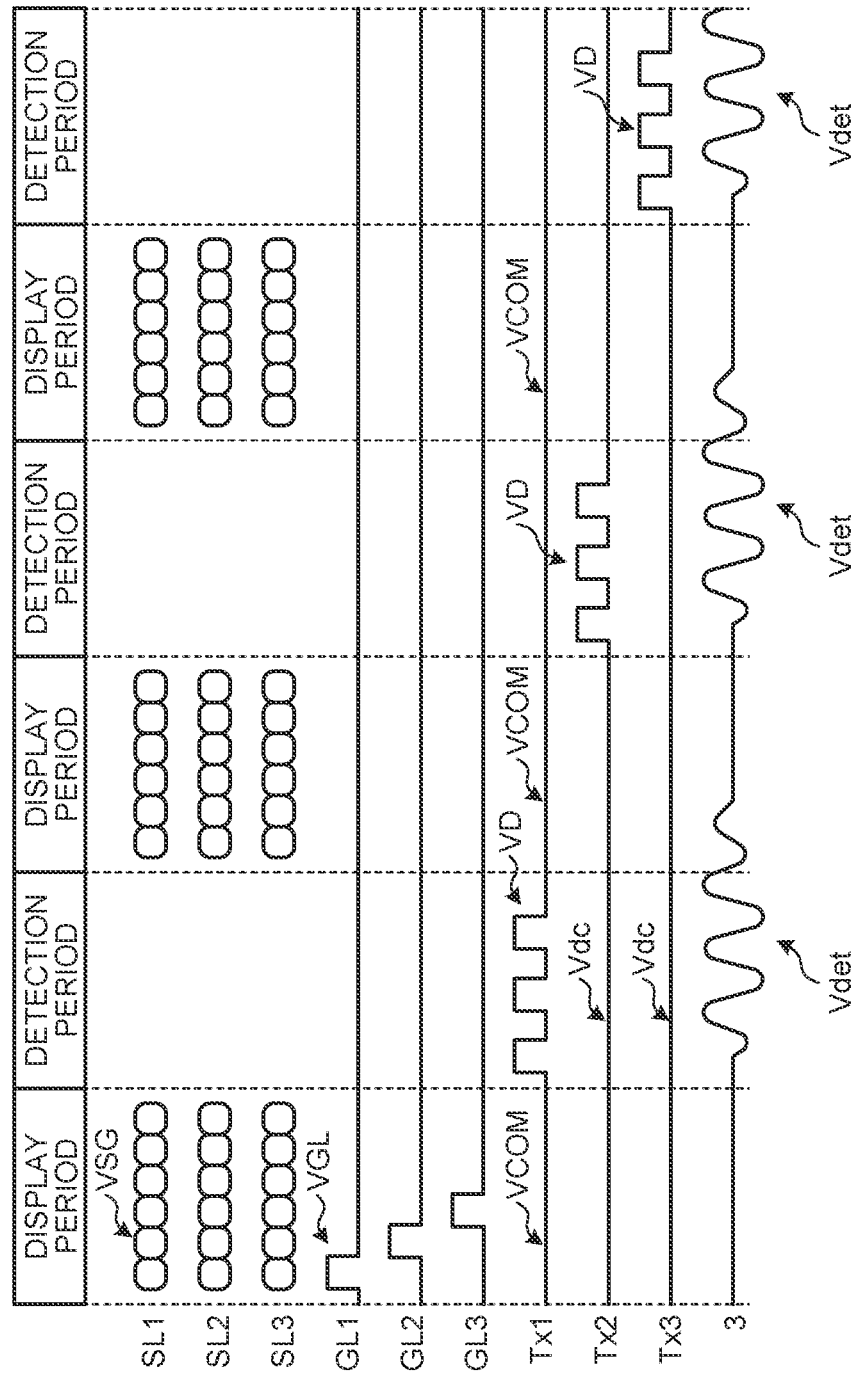
FIG. 14 is a timing waveform chart illustrating a relation between a display period and a detection period.

FIG. 14 is a timing waveform chart illustrating a relation between a display period and a detection period. As illustrated in FIG. 14, in the input detection system 1, the display periods and the detection periods are arranged alternately in a time division manner. FIG. 14 is merely a schematically illustrated timing waveform chart, and the length of each period and the number of pixel signal lines SL, scan lines GL, and drive electrodes Tx, for example, are not limited thereto. The display periods and the detection periods may be arranged in any way. For example, display and detection may be repeated every frame.

The scan line drive circuit 52 supplies the scan signal VGL sequentially to the scan lines GL1, GL2, GL3, and the like in the display period. The display IC 50 supplies pixel signals VSG to the pixel signal lines SL1, SL2, SL3, and the like on the basis of the image signal from the host IC 100. The pixel signals VSG are thereby supplied sequentially to the pixels PX selected on the basis of the scan signal VGL, so that an image is displayed. The display IC 50 supplies the display drive signal VCOM to all of the drive electrodes Tx during the display period. The drive electrodes Tx thereby function as the common electrodes in the display periods. The pixel signals VSG may be written for one frame in one display period, or the pixel signals VSG may be written for a portion of a plurality of regions divided from one frame.

In the detection periods, the detection drive signal VD is supplied sequentially to the drive electrodes Tx1, Tx2, and Tx3. FIG. 14 schematically illustrates the drive electrodes Tx1, Tx2, and Tx3 that are driven in each detection period. All of the drive electrodes Tx (one detection frame) may be driven sequentially in one detection period. The input support device 3 outputs the detection signal Vdet using the resonance of the LC circuit 35. The input support device 3, thus, also outputs the detection signal Vdet during the period overlapping with part of the display period after the end of the detection period.

In the detection period, the display IC 50 causes the pixel signal lines SL to be in a floating state and supplies the reference potential to the scan lines GL. This allows the input detection system 1 to prevent the parasitic capacitance between the drive electrode Tx and the pixel signal line SL and the scan line GL, and to detect well the detection target such as the input support device 3, the finger Fg, or the like.

The reference potential Vdc supplied to the drive electrodes Tx during the detection period is a signal of the same potential as the display drive signal VCOM, but is not limited thereto. The reference potential Vdc may be a signal of a different potential from that of the display drive signal VCOM. In the input detection system 1, a potential difference may occur between the first electrode 31 and the second electrode 32 such that the LC circuit 35 resonances. In other words, the detection drive signal VD may be supplied to the drive electrode Tx with which the first electrode 31 overlaps while the reference potential Vdc may be supplied to the drive electrode Tx with which the second electrode 32 overlaps.

As described above, the input detection system 1 in the first embodiment includes: a plurality of drive electrodes Tx arrayed in the detection region (the display region DA); the drive signal supply circuit 56 that supplies the drive signal (detection drive signal VD) to the drive electrodes Tx; the storage circuit 105 that stores therein the tables having information about the correction value of the drive frequency f-vd of the drive signal; the correction value selection circuit 101 that selects the correction value on the basis of the tables; the LC circuit 35; and the input support device 3 that includes the first electrode 31 coupled to the one end side of the LC circuit 35, and the second electrode 32 coupled to the other end side of the LC circuit 35. The input support device 3 is disposed to overlap with some of the drive electrodes Tx. The reference potential Vdc is supplied to the drive electrode Tx overlapping with the first electrode 31 while the detection drive signal VD having the drive frequency f-vd corrected on the basis of the information from the correction value selection circuit 101 is supplied to the drive electrode Tx overlapping with the second electrode 32.

This allows the input detection system 1 to detect the detection target such as the finger Fg, the input support device 3, or the like by driving the drive electrodes Tx with the identical driving method. The input detection system 1 can easily determine whether the detection target is the finger Fg or the input support device 3 using the resonance of the LC circuit 35. The input detection system 1 can correct the drive frequency f-vd into the optimum drive frequency f-vd even if a deviation occurs between the resonance frequency of the LC circuit 35 and the drive frequency f-vd due to variations in the circuits of the input support device 3 and the detection IC 51 or temperature changes.

Second Embodiment

Figure 15:
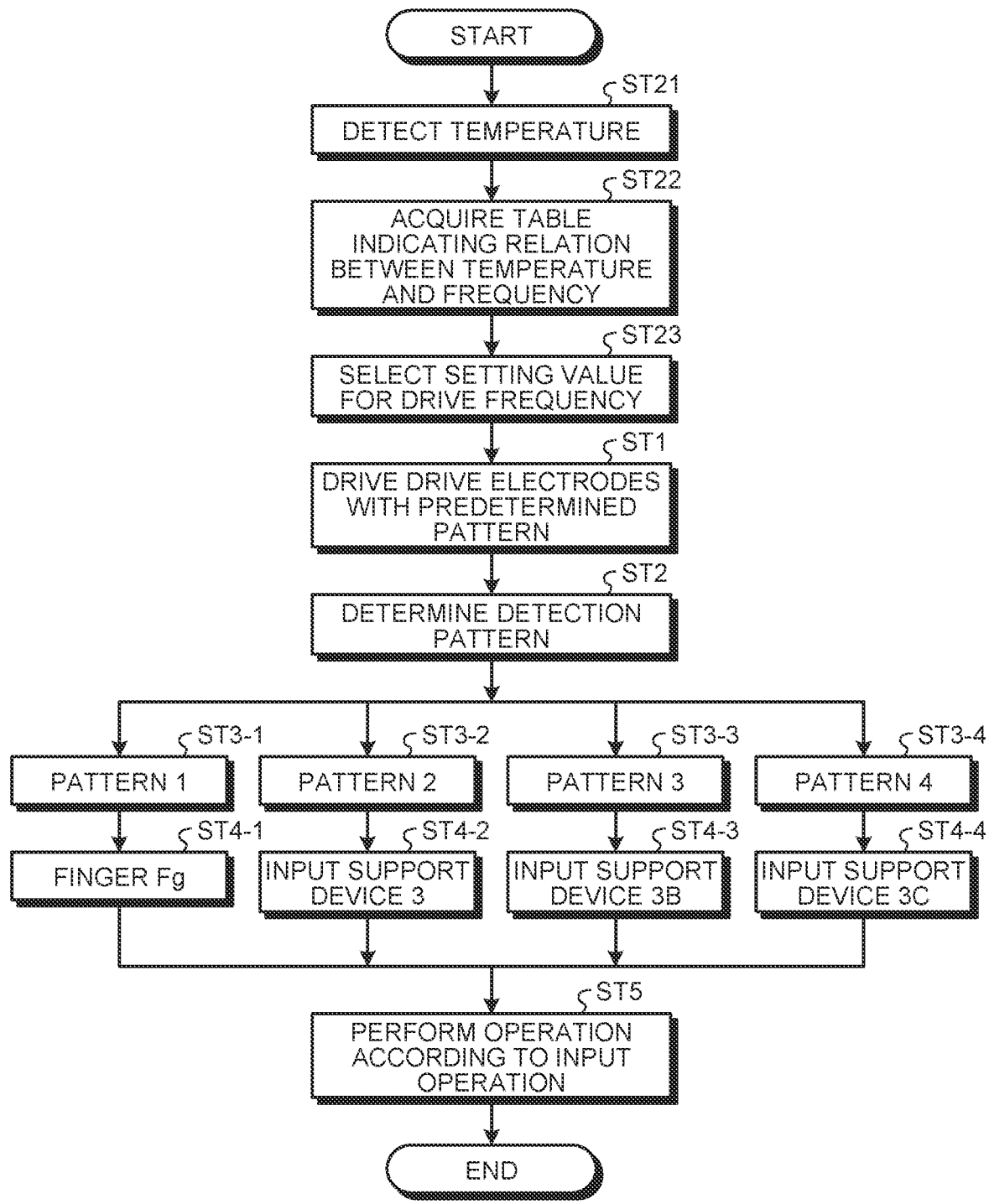
FIG. 15 is a flowchart for explaining a method for correcting the drive frequency of the input detection system according to a second embodiment.
Figure 16:
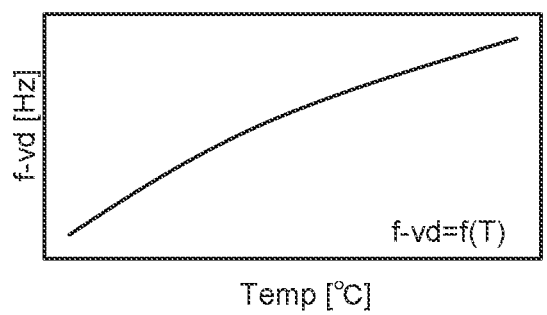
FIG. 16 is a diagram illustrating an example of a table that schematically illustrates a relation between a temperature and the drive frequency.
Figure 17:
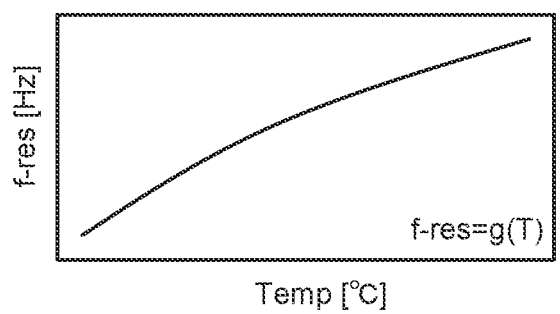
FIG. 17 is a diagram illustrating an example of another table that schematically illustrates a relation between a temperature and the resonance frequency.

FIG. 15 is a flowchart for explaining a method for correcting the drive frequency of the input detection system according to a second embodiment. FIG. 16 is a diagram illustrating an example of a table that schematically illustrates a relation between a temperature and the drive frequency. FIG. 17 is a diagram illustrating another example of a table that schematically illustrates a relation between a temperature and the resonance frequency.

As illustrated in FIG. 15, the temperature sensor 59 detects a temperature (step ST21). The correction value selection circuit 101 acquires a table indicating a relation between a temperature and a frequency from the storage circuit 105 (step ST22). Examples of the table indicating a relation between a temperature and a frequency include a table 1, which illustrates the relation between a temperature and the drive frequency f-vd, illustrated in FIG. 16, and a table 2, which illustrates the relation between a temperature and the resonance frequency f-res, illustrated in FIG. 17. The relation between a temperature and the drive frequency f-vd illustrated in FIG. 16 is the temperature characteristic of the drive frequency setting value and the actual output drive frequency. The table 2, which illustrates the relation between a temperature and the resonance frequency f-res illustrated in FIG. 17, may be provided for each of the input support devices 3.

The correction value selection circuit 101 selects a setting value for the drive frequency f-vd from the information about the temperature output from the temperature sensor 59, the temperature characteristic of the drive frequency f-vd (refer to FIG. 16), and the temperature characteristic of the resonance frequency f-res (Step ST23). The correction value selection circuit 101 transmits the information about the drive frequency f-vd corrected on the basis of the information about the temperature to the display IC 50. The display IC 50 and detection IC 51 drive the drive electrodes Tx with the detection drive signal VD having the corrected drive frequency f-vd (step ST1). After step ST1, detection of the detection target is performed in the same manner as in the first embodiment described above. For example, it is determined that the detection target is present when the intensity (detection value) of the output signal Vo is equal to or larger than, by a predetermined value, the intensity (baseline) of the output signal Vo in a case where the input support device 3 or the finger Fg is not in contact with the upper surface 111a. The drive electrodes Tx are driven at the drive frequency having a frequency that can determine the presence or absence of the detection target even taking into account errors and the operating temperature range. As for the baseline (V-Base), which is the intensity of the output signal Vo when the input support device 3 or the finger Fg is not in contact with the upper surface 111a, the detection value measured with no detection target placed on the touch panel sensor at the time of product shipment can be stored in a table as the baseline (V-Base). The value detected immediately after power-on may be stored in a table as the baseline (V-Base). When a value in a predetermined value range continues for a predetermined number of detection periods in use of the product, the value may be used as the baseline (V-Base).

In the second embodiment, on the basis of the table and the information about a temperature from the temperature sensor 59, the drive frequency f-vd according to the temperature can be properly selected, even when a deviation occurs in the resonance frequency of the LC circuit 35 due to temperature change or a deviation occurs in the drive frequency f-vd due to temperature change. When the temperature characteristic of the drive frequency f-vd is negligible, the correction for the relation between a temperature and the drive frequency may be omitted.

Third Embodiment

Figure 18:
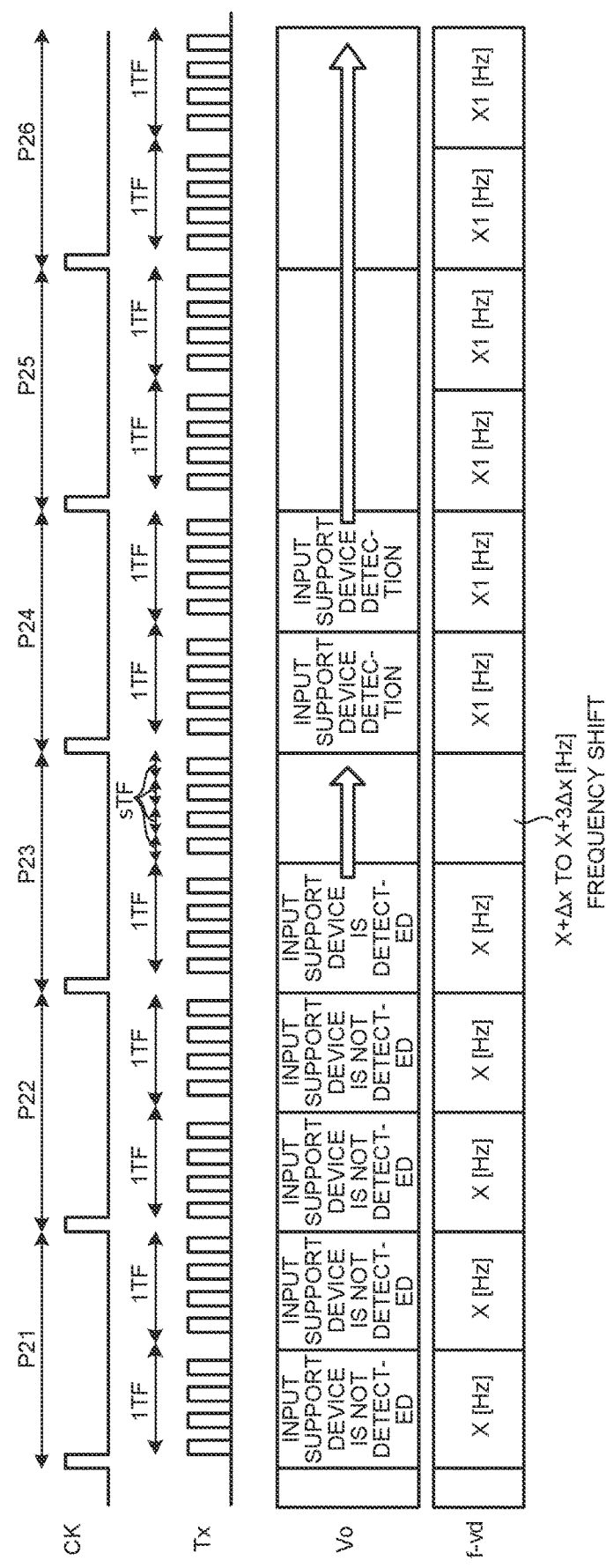
FIG. 18 is a descriptive view for explaining a method for correcting the drive frequency in the input detection system according to a third embodiment.

FIG. 18 is a descriptive view for explaining a method for correcting the drive frequency in the input detection system according to a third embodiment. The first embodiment described above explains an example in which the drive frequency f-vd is changed at each period specified by the control signal CK when frequency shift is performed. The changing manner is not limited to this example.

As illustrated in FIG. 18, in the third embodiment, detection of a detection frame 1TF is performed twice in each period. In other words, the frequency of the repetition of the detection frame 1TF is about twice the frequency of the control signal CK.

When a detection target is detected in the period P23, the drive frequency change circuit 102 acquires, from the storage circuit 105, information about a plurality of drive frequencies f-vd to perform the frequency shift, as a table about the correction values. The drive frequency change circuit 102 supplies the information about the drive frequency f-vd to the drive signal supply circuit 56.

In the latter half of the period P23, among the drive electrodes Tx, the drive signal supply circuit 56 selects the drive electrodes Tx that overlap with a partial region sTF in which the detection target (the input support device 3) is detected. The drive signal supply circuit 56 shifts the frequency on the basis of the table acquired from the storage circuit 105, i.e., changes the drive frequency f-vd of the detection drive signal VD, and supplies it sequentially to the drive electrodes Tx in the selected partial region sTF.

The drive frequency change circuit 102 changes the drive frequency f-vd from X (Hz) to X1 (Hz) in the same manner as the first embodiment described above. The drive signal supply circuit 56 drives the drive electrodes Tx at the corrected drive frequency f-vd from the period P24 onward.

In the third embodiment, the detection time can be reduced by driving the drive electrodes Tx only in the partial region sTF when the frequency is shifted for detection. The detection of the detection frame 1TF is not necessarily limited to being performed twice in each period, but may be performed once in each period in the same manner as the first embodiment.

Fourth Embodiment

Figure 19:
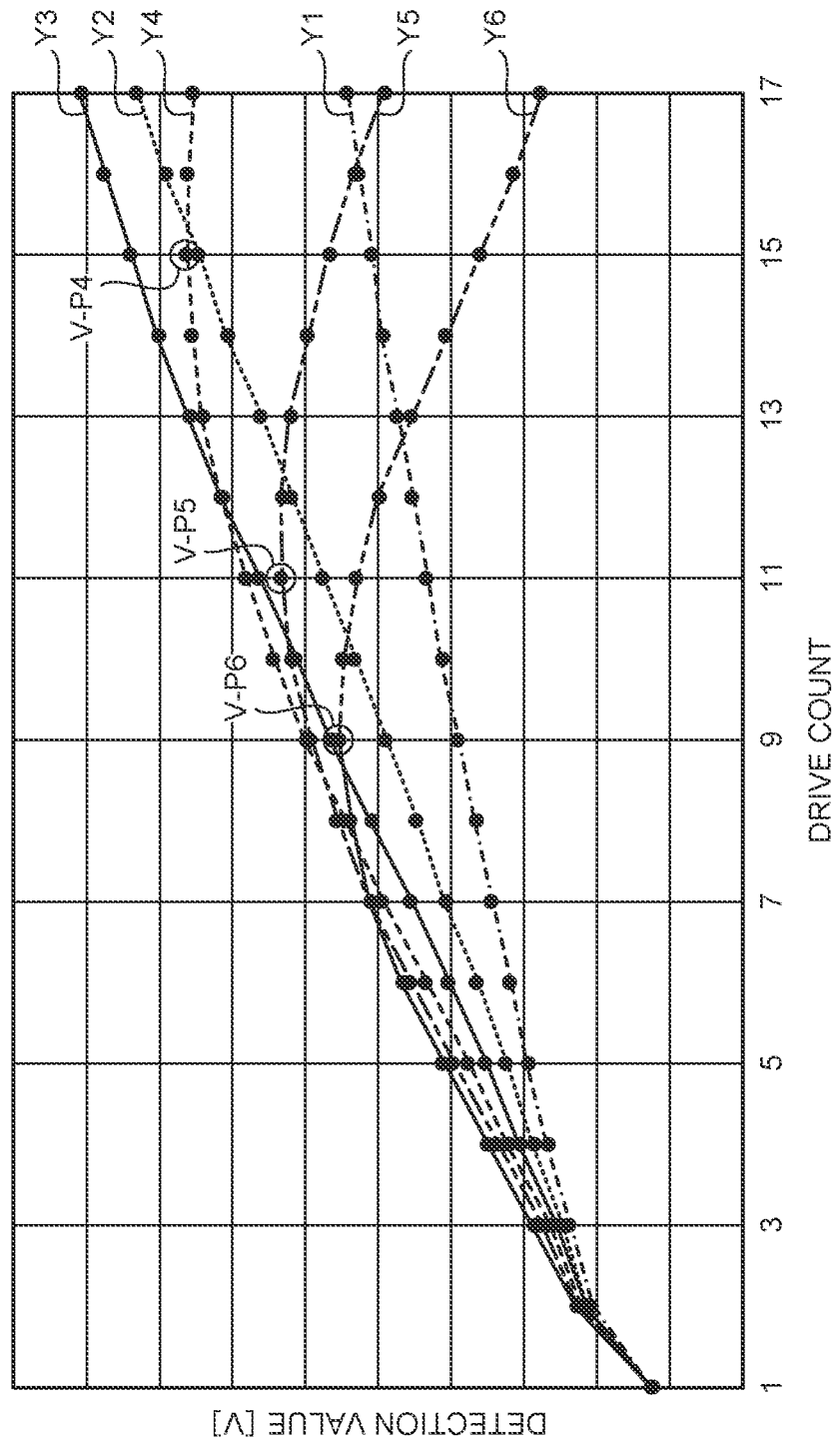
FIG. 19 is a graph schematically illustrating a relation between a drive count (i.e., the number of drive times) and the detection value of the detection signal in the input detection system according to a fourth embodiment.
Figures 20, 21:
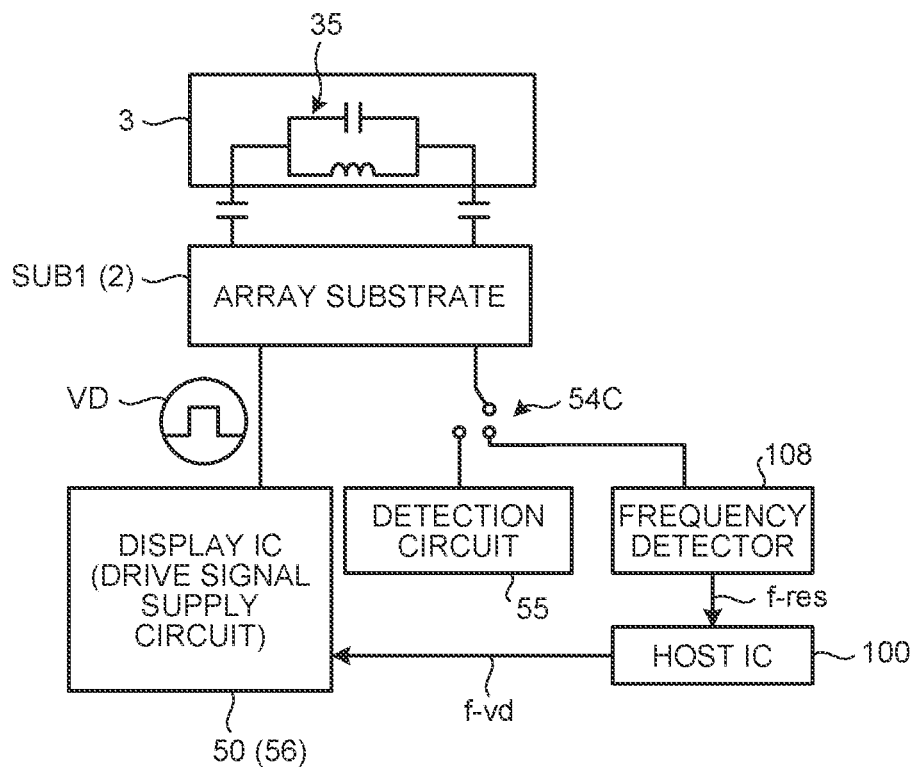
FIG. 20 is a diagram illustrating an example of a table that schematically illustrates a relation between the drive frequency and a detection-value drive-count pattern.
FIG. 21 is a block diagram schematically illustrating an input detection system according to a fifth embodiment.

FIG. 19 is a graph schematically illustrating a relation between a drive count (i.e., the number of drive times) and the detection value in the input detection system according to a fourth embodiment. FIG. 20 is a graph illustrating an example of a table that schematically illustrates a relation between the drive frequency and a detection-value drive-count pattern.

As illustrated in FIG. 19, the detection of the input support device 3 uses the resonance of the LC circuit 35, resulting in the detection value of the output signal Vo changing according to the drive count. FIG. 19 schematically illustrates the relation between the drive count and the detection value when the resonance frequency f-res is varied from Y1 (Hz) to Y6 (Hz). The frequency is increased from Y1 (Hz) to Y6 (Hz) in this order.

The curves of the resonance frequencies f-res from Y1 (Hz) to Y3 (Hz) have no peaks in the patterns up to the drive count of 17 and indicate an increasing trend of the detection values. The slope of the detection values tends to increase in the order from Y1 (Hz) to Y3 (Hz). The curves of the resonance frequencies f-res from Y4 (Hz) to Y6 (Hz) have peak detection values of V-P4, V-P5, and V-P6, respectively. The drive counts indicating the peak detection values V-P4, V-P5, and V-P6 vary according to the resonance frequency f-res. The drive counts indicating the peak detection values V-P4, V-P5, and V-P6 become smaller in the order of resonance frequency f-res from Y4 (Hz) to Y6 (Hz).

The calculation circuit 104 calculates the slope, the magnitude, and the peak detection value (maximum value) of the detection value on the basis of a relation between the number of drive times and the detection value.

The storage circuit 105 stores therein a table 3, which indicates a relation between the drive frequency f-vd and a detection-value drive-count pattern as illustrated in FIG. 20. FIG. 20 indicates the patterns for each of the drive frequencies f-vd, i.e., X−2Δx, X−Δx, X, X+Δx, and X+2Δx, where the pattern of the drive frequency f-vd of X (Hz) is referred to as a reference.

The drive signal supply circuit 56 supplies the drive signal VD having a predetermined frequency to the drive electrodes Tx multiple times and detects the detection value for each drive count. The correction value selection circuit 101 compares the information in the table 3 with the pattern indicating the relation with the actual detected detection-value drive-count pattern. The correction value selection circuit 101 selects the closest pattern from the patterns in the table 3 and calculates the deviation between the actual drive frequency f-vd and the resonance frequency v-res. The correction value selection circuit 101 can select a correction value for the drive frequency f-vd on the basis of this amount of deviation. As an example of how to select the closest pattern, at least one type pattern is selected according to the detection value when the drive is performed the predetermined number of times.

In the fourth embodiment, the correction value is selected on the basis of the detection-value drive-count pattern using resonance, thereby making it possible to more reliably correct the drive frequency f-vd.

Fifth Embodiment

Figure 22:
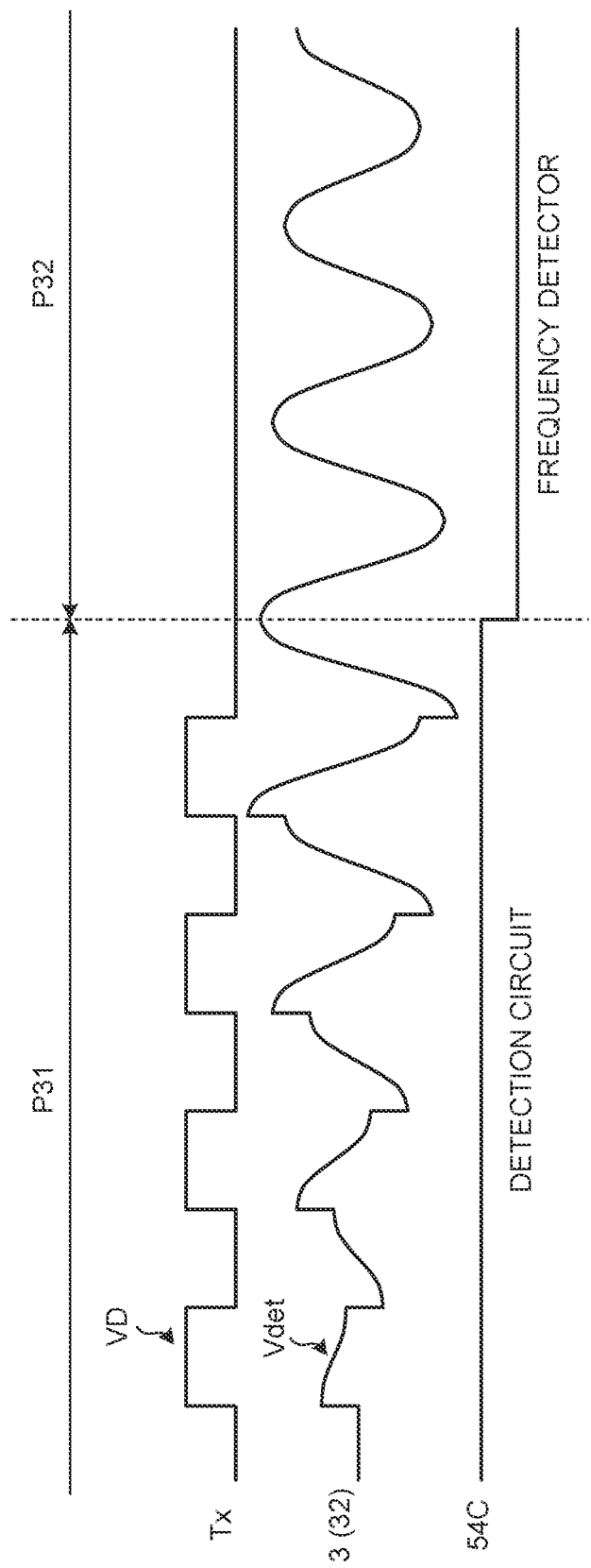
FIG. 22 is a timing waveform chart for explaining a method for correcting the drive frequency in the input detection system according to the fifth embodiment.

FIG. 21 is a block diagram schematically illustrating an input detection system according to a fifth embodiment. FIG. 22 is a timing waveform chart for explaining a method for correcting the drive frequency in the input detection system according to the fifth embodiment. In the fifth embodiment, a structure including a frequency detector 108 that detects the frequency of the signal is explained.

Specifically, as illustrated in FIG. 21, a switch element 54C can switch the coupling states between the frequency detector 108 and the detection electrode Rx of the array substrate SUB1, and switch the coupling states between the detection circuit 55 and the detection electrode Rx of the array substrate SUB1.

As illustrated in FIG. 22, the drive signal supply circuit 56 supplies the detection drive signal VD to the drive electrodes Tx in the period P31. The detection electrode Rx is coupled to the detection circuit 55 by the operation of the switch element 54C in the period P31. The detection signal Vdet is output to the detection circuit 55.

In the period P32 after the drive signal supply circuit 56 stops supplying the detection drive signal VD, the detection electrode Rx is coupled to the frequency detector 108 by the operation of the switch element 54C. In other words, the detection electrode Rx is not coupled to the detection circuit 55 by the operation of the switch element 54C in the period P32. This allows the frequency detector 108 to detect the frequency of the detection signal Vdet, i.e., the resonance frequency f-res of the LC circuit 35.

As illustrated in FIG. 21, the frequency detector 108 outputs the information about the resonance frequency f-res to the host IC 100. The correction value selection circuit 101 selects a correction value for the drive frequency f-vd on the basis of the information about the resonance frequency f-res. More specifically, the drive frequency f-vd is corrected to match the resonance frequency f-res. The correction value selection circuit 101 outputs the information about the corrected drive frequency f-vd to the display IC 50.

In the fifth embodiment, the frequency of the detection signal Vdet is directly detected by the frequency detector 108. The fifth embodiment thus can simply correct the drive frequency f-vd by omitting calculation processing and the like. Detection of the frequency detector 108 may be performed at regular intervals or at startup of the input detection system 1.

Sixth Embodiment

Figure 23:
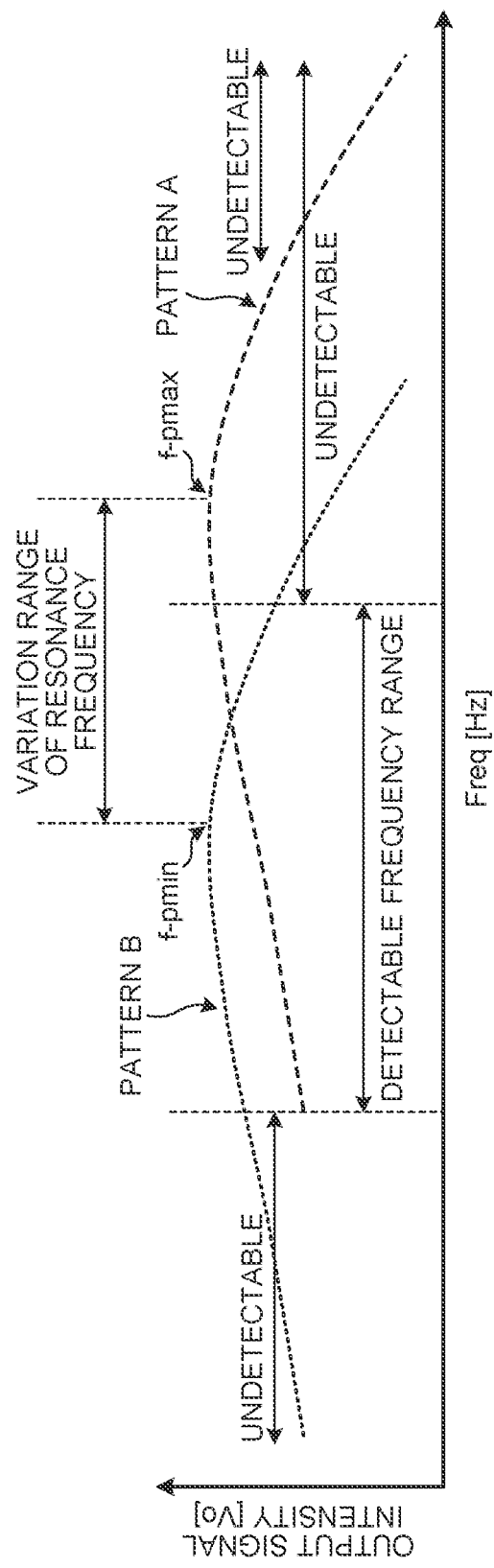
FIG. 23 is a descriptive view for explaining a method for detecting the input support device of the input detection system according to a sixth embodiment.

FIG. 23 is a descriptive view for explaining a method for detecting the input support device in the input detection system according to a sixth embodiment. In the sixth embodiment, the storage circuit 105 stores therein two patterns of A and B that indicate the relation between the drive frequency f-vd and the detection value. When temperatures and circuit errors are taken into account in the environment where the input detection system 1 is used, the pattern A is a pattern in which the resonant frequency f-res has a maximum frequency f-pmax while the pattern B is a pattern in which the resonant frequency f-res has a minimum frequency f-pmin.

As illustrated in FIG. 23, the correction value selection circuit 101 pre-sets a detectable frequency range from the two patterns of A and B and selects a frequency in the detectable frequency range as the drive frequency f-vd. The frequency of the detectable frequency range is selected as the driving frequency f-vd such that the detection value of the output signal strength (Vo) is equal to or larger than a predetermined value in both of the two patterns of A and B. The drive signal supply circuit 56 supplies the detection signal VD having the drive frequency f-vd selected on the basis of the patterns A and B to the drive electrodes Tx. This allows the display device 2 to detect the input support device 3 well even during the period before the input support device 3 is detected (e.g., the periods P21 and P22 in FIG. 18) or before the correction of the drive frequency f-vd is performed.

Seventh Embodiment

Figure 24:
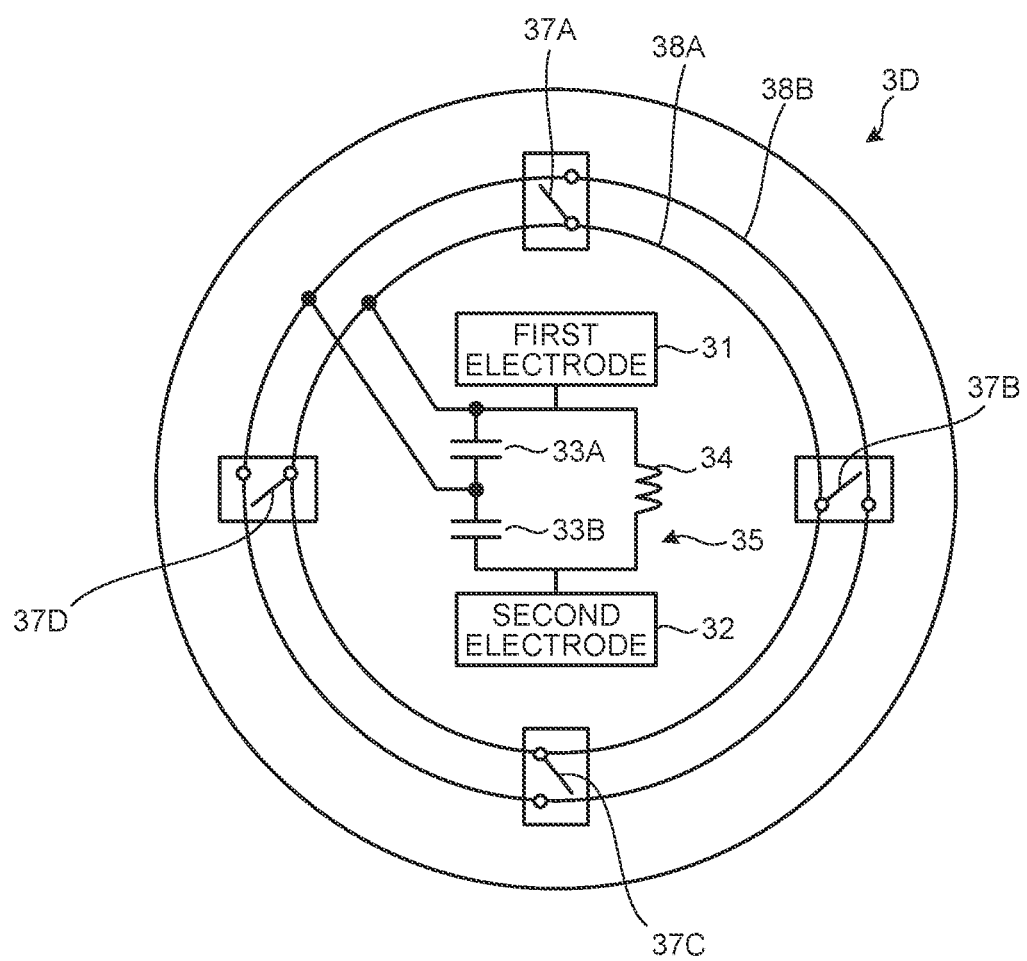
FIG. 24 is a circuit diagram illustrating an input support device of an input detection system according to a seventh embodiment.
Figure 25:
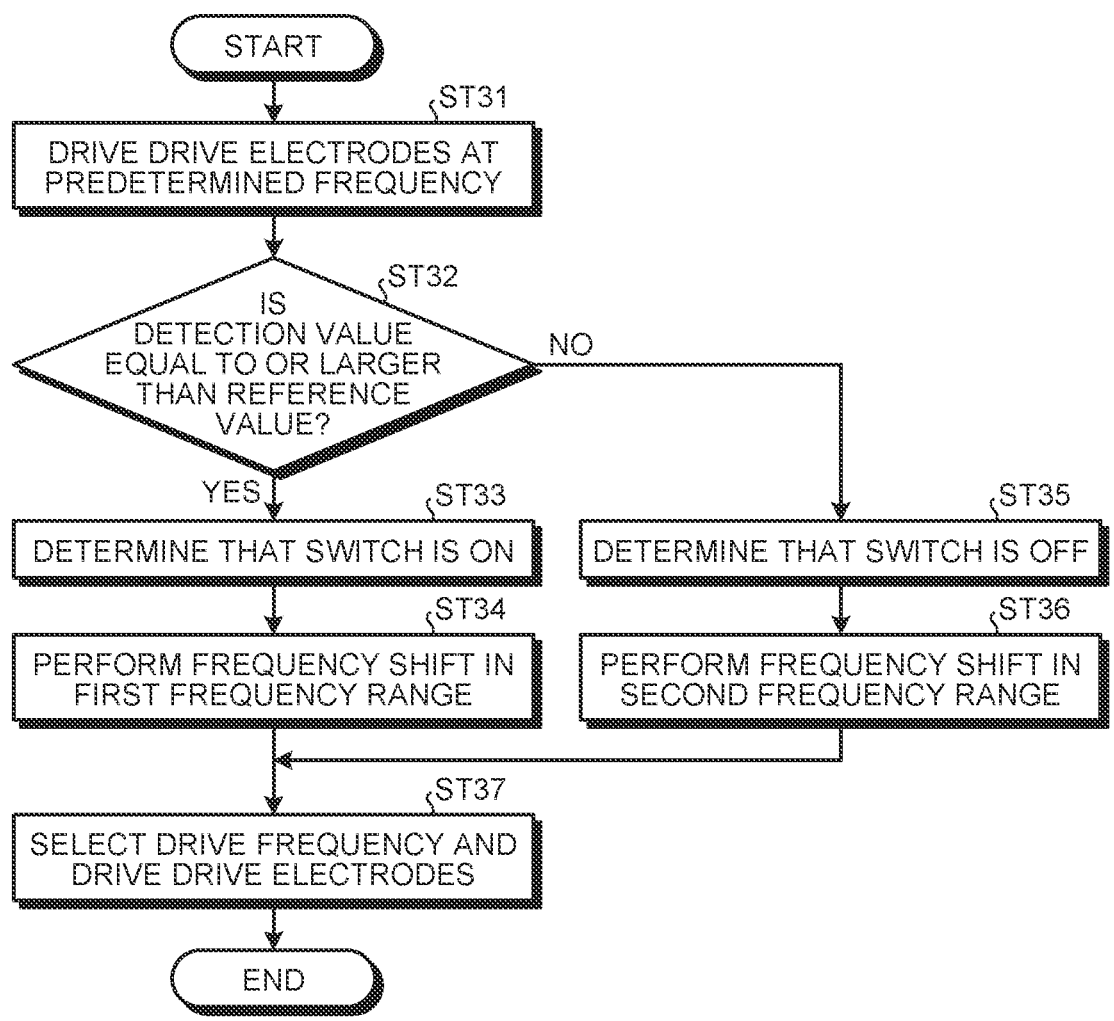
FIG. 25 is a flowchart for explaining a method for correcting the drive frequency in the input detection system according to the seventh embodiment.
Figure 26:
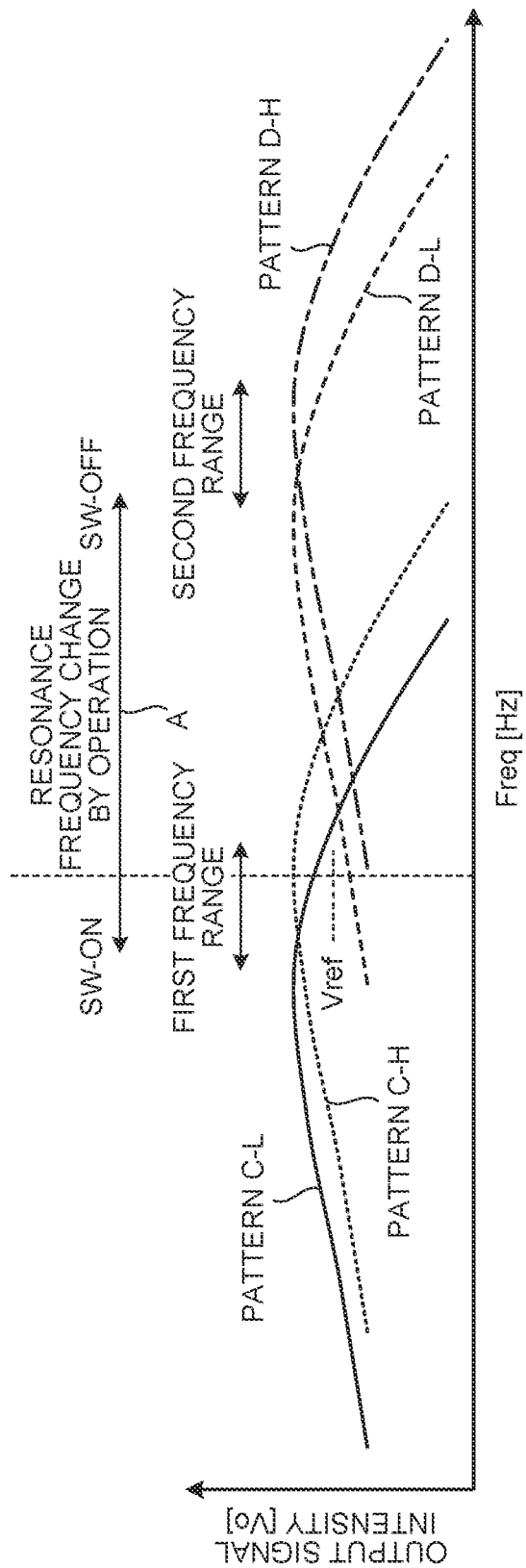
FIG. 26 is a graph schematically illustrating a relation between the drive frequency and the detection value of the detection signal in the input detection system according to the seventh embodiment.

FIG. 24 is a circuit diagram illustrating an input support device in an input detection system according to a seventh embodiment. FIG. 25 is a flowchart for explaining a method for correcting the drive frequency in the input detection system according to the seventh embodiment. FIG. 26 is a graph schematically illustrating a relation between the drive frequency and the detection value of the detection signal in the input detection system according to the seventh embodiment.

As illustrated in FIG. 24, this input support device 3D in the seventh embodiment includes switch elements 37A, 37B, 37C, and 37D. The switch elements 37A, 37B, 37C, and 37D switch the resonant frequency f-res of the LC circuit 35 between a first frequency and a second frequency higher than the first frequency.

Specifically, the LC circuit 35 includes capacitors 33A and 33B coupled in series. A first wiring line 38A is coupled to one end side of the capacitor 33A. A second wiring line 38B is coupled to the other end side of the capacitor 33A between the capacitors 33A and 33B. The switch elements 37A, 37B, 37C, and 37D can switch between a state where both ends of the capacitor 33A are short-circuited and a state where both ends of the capacitor 33A are open by switching the coupling states between the first wiring line 38A and the second wiring line 38B.

When any one of the switch elements 37A, 37B, 37C, 37D is turned on (in a coupling state), both ends of the capacitor 33A are short-circuited and one end side of the capacitor 33B is electrically coupled to the first electrode 31 via the first wiring line 38A and the second wiring line 38B. When the switch elements 37A, 37B, 37C, 37D are all turned off (in an uncoupling state), the capacitor 33B and the capacitor 33A are coupled in series. As a result, the capacitance components are switched between the first electrode 31 and the second electrode 32.

The switch elements 37A, 37B, 37C, 37D can be switched between on and off by operating a pushbutton provided on the input support device 3D, for example. The first wiring line 38A and the second wiring line 38B are each provided in annularly, and the switch elements 37A, 37B, 37C, 37D are arrayed along the circumferential direction of the input support device 3D. The arrangement and the numbers of first wiring lines 38A and second wiring lines 38B can be appropriately modified. At least one of the switch elements 37A, 37B, 37C, 37D may be provided. In the following explanation, the switch elements 37A, 37B, 37C, and 37D are collectively and simply denoted as the switch element 37 when they need not to be distinguished from one another.

As illustrated in FIG. 25, the display IC 50 drives the drive electrodes Tx with the drive signal VD having a predetermined frequency on the basis of the control signal from the correction value selection circuit 101 (step ST31). The predetermined frequency is a first frequency f-t illustrated in FIG. 26, for example.

In the seventh embodiment, the storage circuit 105 stores therein patterns C and D illustrated in FIG. 26 as patterns that indicate the relation between the drive frequency f-vd and the detection value. The pattern C indicates the relation between the drive frequency f-vd and the detection value when the switch element 37 is on. The pattern D indicates the relation between the drive frequency f-vd and the detection value when the switch element 37 is off. The storage circuit 105 stores therein multiple patterns for each of the patterns C and D, taking into account temperatures and circuit errors. In other words, the storage circuit 105 has a first table (the pattern C) including a plurality of correction values for the drive frequency f-vd corresponding to the first frequency, and a second table (the pattern C) including a plurality of correction values for the drive frequency f-vd corresponding to the second frequency.

A pattern C-L is the pattern in which the resonance frequency has a minimum frequency when the switch element 37 is on. A pattern C-H is the pattern in which the resonance frequency has a maximum frequency when the switch element 37 is on. A pattern D-L is the pattern in which the resonance frequency has a minimum frequency when the switch element 37 is off. A pattern D-H is the pattern in which the resonance frequency has a maximum frequency when the switch element 37 is off.

The LC circuit coupling determination circuit 103 (refer to FIG. 9) of the correction value selection circuit 101 determines whether the detection value is equal to or larger than the reference value Vref when the drive electrodes Tx are driven at a predetermined frequency (the first frequency f-t) (step ST32). If the detection value is equal to or larger than the reference value Vref (Yes at step ST32), the LC circuit coupling determination circuit 103 of the correction value selection circuit 101 determines that the switch element 37 is on (step ST33).

The correction value selection circuit 101 performs frequency shift in the first frequency range, which is the range of resonance frequency from the pattern C-L to the pattern C-H (step ST34). In the same manner as the first embodiment, the calculation circuit 104 calculates the peak frequency f-p that indicates the maximum detection value from the relation between the drive frequency f-vd and the detection value when the drive electrodes Tx are driven at each frequency. The correction value selection circuit 101 selects the peak frequency f-p as the drive frequency f-vd on the basis of the result of the frequency shift in the first frequency range. The drive signal supply circuit 56 drives the drive electrodes Tx at the corrected drive frequency f-vd (step ST37).

If the detected value is smaller than the reference value Vref (No at step ST32), the LC circuit coupling determination circuit 103 of the correction value selection circuit 101 determines that the switch element 37 is off (step ST35). The correction value selection circuit 101 performs frequency shift in the second frequency range, which is the range of resonance frequency from the pattern D-L to the pattern D-H (step ST36). The correction value selection circuit 101 selects the drive frequency f-vd on the basis of the result of the frequency shift in the second frequency range. The drive signal supply circuit 56 drives the drive electrodes Tx at the corrected drive frequency f-vd (step ST37).

In the seventh embodiment, the correction value selection circuit 101 determines the switching of the switch element 37 on the basis of the detection value when the drive signal VD having a predetermined frequency (the first frequency f-t) is supplied to the drive electrodes Tx. This makes it possible to determine the operating state (on or off) of the switch element 37 of the input support device 3D on the basis of the preliminarily stored tables (the patterns C and D), even when the resonance frequency of the input support device 3D is variable by the user's operation. This allows the drive frequency f-vd to be selected appropriately according to the operating state of the switch element 37.

Eighth Embodiment

Figure 27:
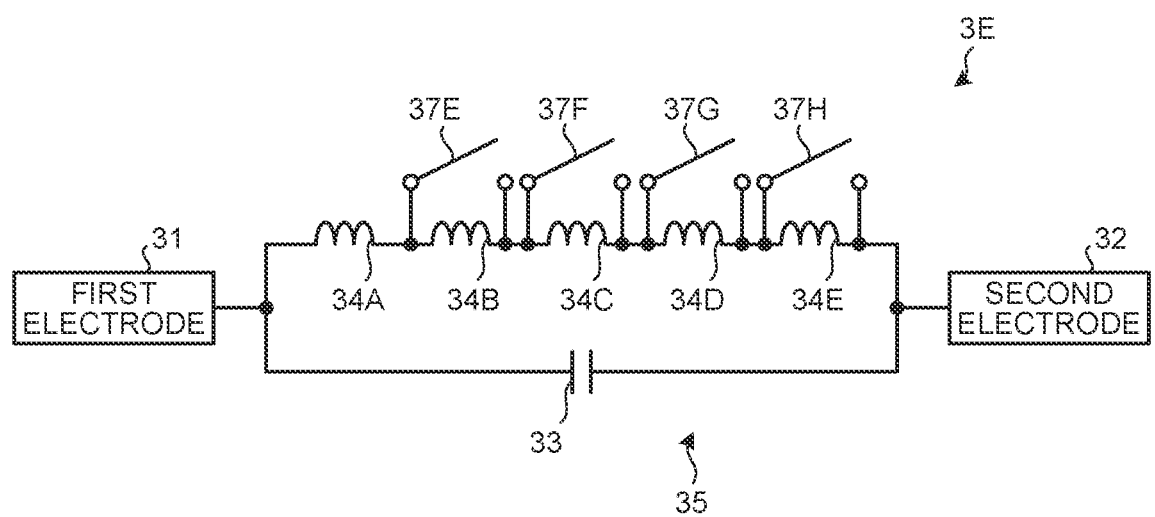
FIG. 27 is a circuit diagram illustrating an input support device of an input detection system according to an eighth embodiment.
Figure 28:
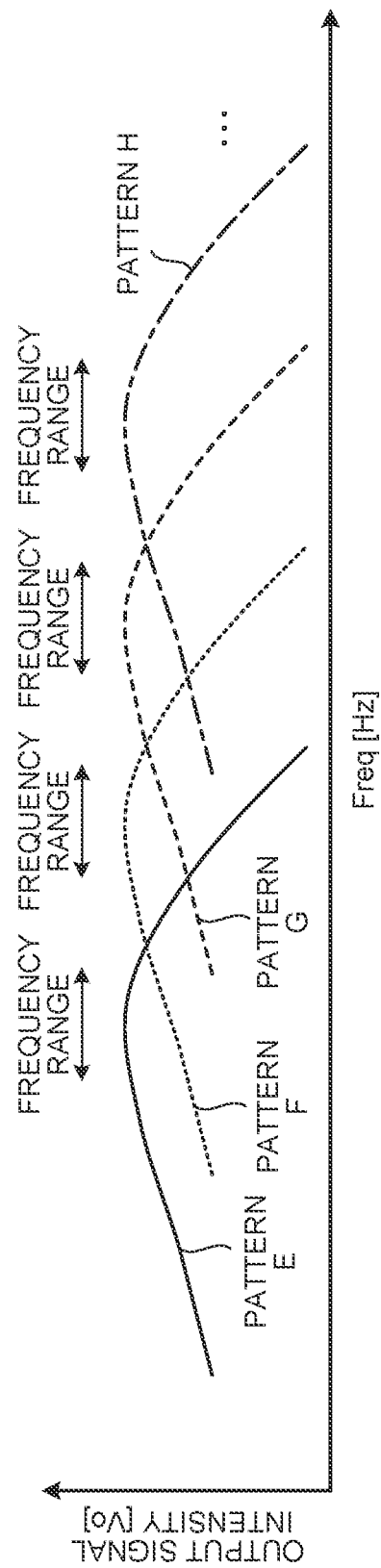
FIG. 28 is a graph schematically illustrating a relation between the drive frequency and the detection value of the detection signal in the input detection system according to the eighth embodiment.

FIG. 27 is a circuit diagram illustrating an input support device in an input detection system according to an eighth embodiment. FIG. 28 is a graph schematically illustrating a relation between the drive frequency and the detection value of the detection signal in the input detection system according to the eighth embodiment.

As illustrated in FIG. 27, this input support device 3E in the eighth embodiment includes switch elements 37E, 37F, 37G, and 37H. The switch elements 37E, 37F, 37G, and 37H switch the resonant frequency f-res of the LC circuit 35 into a plurality of different frequencies.

Specifically, the LC circuit 35 includes a plurality of inductors 34A, 34B, 34C, 34D, and 34E coupled in series. The switch elements 37E, 37F, 37G, and 37H are coupled in parallel to the inductors 34B, 34C, 34D, and 34E, respectively. When any of the switch elements 37E, 37F, 37G, and 37H is turned on, the corresponding one of the inductors 34B, 34C, 34D, and 34E is short-circuited. This allows the inductance value between the first electrode 31 and the second electrode 32 to be variable.

The inductance values of the inductors 34A, 34B, 34C, 34D, and 34E may be different from one another. Alternatively, the inductance values of the inductors 34A, 34B, 34C, 34D, and 34E may be the same. The number of switch elements 37 to be turned on in the switch elements 37E, 37F, 37G, and 37H can also be changed arbitrarily from 0 to 4. The number of inductors 34A, 34B, 34C, 34D, 34E coupled in series is not limited to 5, but may be 4 or less, or 6 or more. The number of switch elements 37 is not limited to 4, but may be 3 or less, or 5 or more.

As illustrated in FIG. 28, the storage circuit 105 stores therein patterns E, F, G, and H as the patterns indicating the relation between the drive frequency f-vd and the detection value. The number of patterns is the same as the number of inductances that can be varied by the operating state (on or off) of the switch elements 37. In the same manner as the seventh embodiment described above, the correction value selection circuit 101 can determine the operating states (on or off) of the switch elements 37 of the input support device 3E on the basis of the preliminarily stored tables (from the pattern E to the pattern H) and select the drive frequency f-vd appropriately. Specifically, when the inductance values of the inductors 34A, 34B, 34C, 34D, and 34E are different from one another, the location of the switch that is turned on can be identified by corresponding to the patterns E, F, G, and H, each of which indicates the relation between the drive frequency f-vd and the detection value according to the location where the switch is turned on. Even when the inductance values of the inductors 34A, 34B, 34C, 34D, and 34E are the same, the number of switches that are turned on can be identified by corresponding to patterns E, F, G, and H, each of which indicates the relation between the drive frequency f-vd and the detection value according to the number of switches that are turned on. The locations and the number of switches that are turned on can be specified in more detail by setting the inductance values of the inductors 34A, 34B, 34C, 34D, and 34E to different values from one another, and by corresponding to the patterns E, F, G, and H, each of which indicates the relation between the drive frequency f-vd and the detection value according to the locations and the number of switches that are turned on.

Ninth Embodiment

Figure 29:
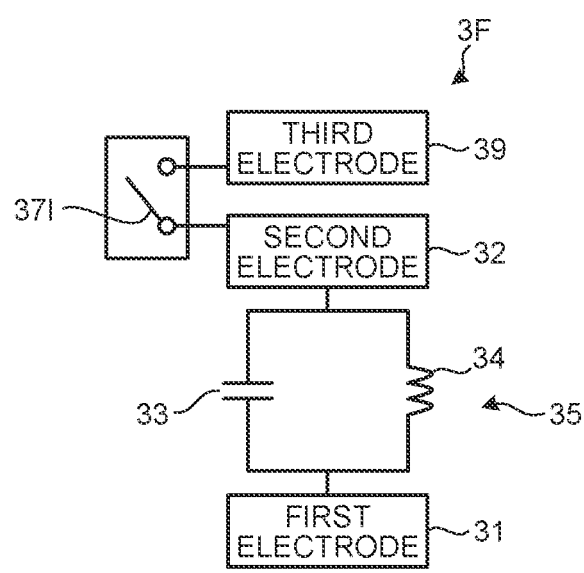
FIG. 29 is a circuit diagram illustrating an input support device in an input detection system according to a ninth embodiment.

FIG. 29 is a circuit diagram illustrating an input support device in an input detection system according to a ninth embodiment. As illustrated in FIG. 29, this input support device 3F in the ninth embodiment includes a third electrode 39 adjacent to the second electrode 32. The coupling between the second electrode 32 and the third electrode 39 is switched by a switch element 371. The capacitance C2 (refer to FIG. 7) formed between the second electrode 32 and the drive electrode Tx is variable between the coupling state and uncoupling state between the second electrode 32 and the third electrode 39. This allows the resonant frequency of the LC circuit 35 to be variable.

In the ninth embodiment, the storage circuit 105 stores therein a plurality of patterns corresponding to the on and off of the switch element 371 in the same manner as described with reference to FIG. 26. The correction value selection circuit 101 can appropriately select the drive frequency f-vd by determining the operating state (on or off) of the switch element 371 of the input support device 3F on the basis of the preliminarily stored tables.

Tenth Embodiment

Figure 30:
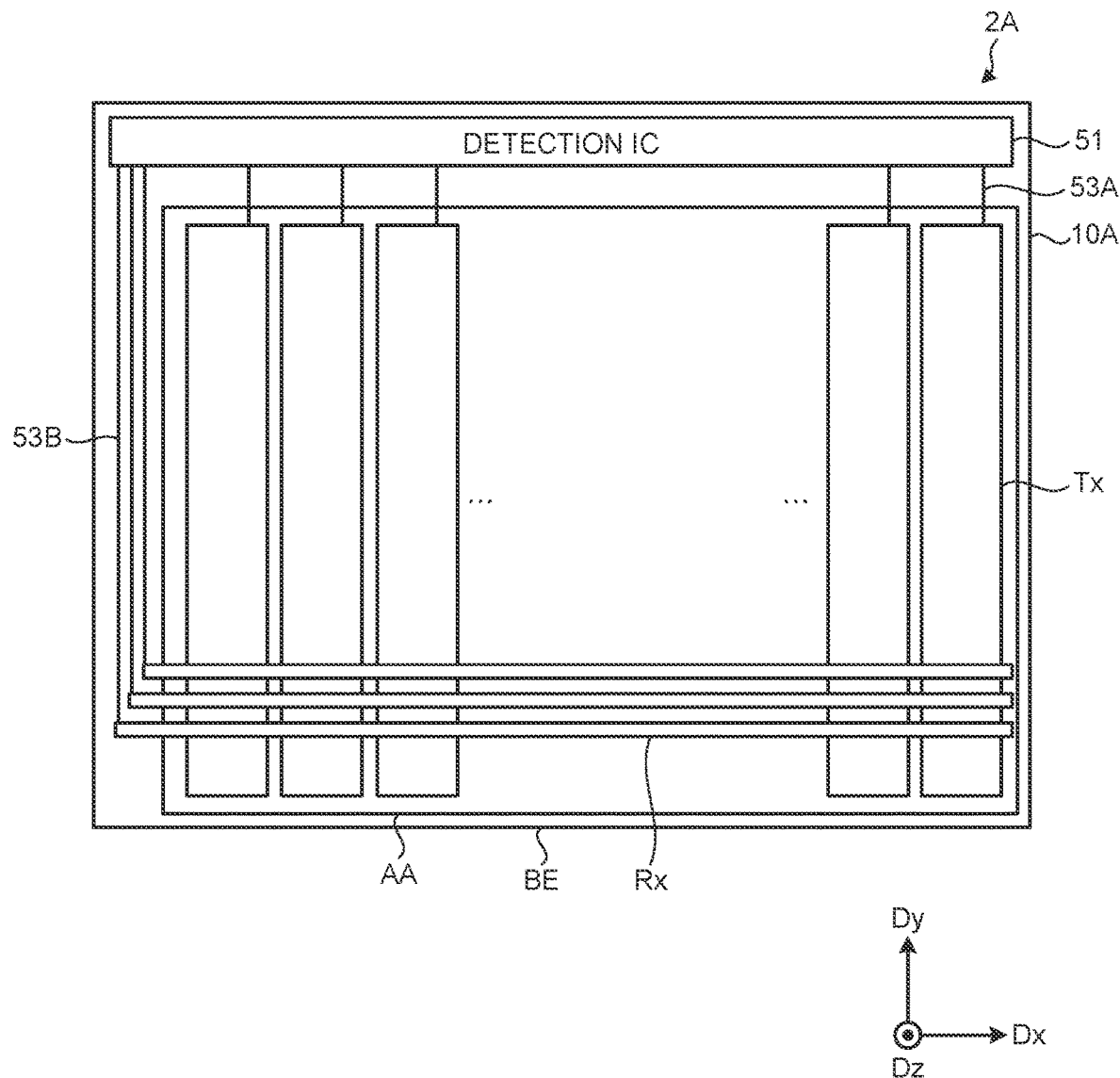
FIG. 30 is a plan view schematically illustrating a detecting device of an input detection system according to a tenth embodiment.

FIG. 30 is a plan view schematically illustrating a detecting device of an input detection system according to a tenth embodiment. In the embodiments and modifications described above, the input detection system 1 includes the display device 2 with the detection function. The tenth embodiment differs from the embodiments described above in that a detecting device 2A is included instead of the display device 2.

As illustrated in FIG. 30, the detecting device 2A includes a substrate 10A, a plurality of drive electrodes Tx arrayed in a detection region AA of the substrate 10A, and a plurality of detection electrodes Rx. The drive electrodes Tx and the detection electrodes Rx are provided to intersect with each other in the detection region AA. The detecting device 2A is a touch panel, for example. The detecting device 2A may be overlaid on the display device or may be provided separately from the display device. In other words, the input detection system in the tenth embodiment may not include the display device. The input detection system in the tenth embodiment may include at least the detecting device 2A and the input support device 3 disposed on the detecting device 2A. The method for correcting the drive frequency f-vd of the drive electrodes Tx can employ that of each embodiment described above.

The drive electrodes Tx and the detection electrodes Rx are provided on the identical substrate, i.e., the substrate 10A. Arrangement is, however, not limited to this example. The drive electrodes Tx and the detection electrodes Rx may be provided on different substrates. The detecting device 2A is not limited to employing mutual electrostatic capacitance-type touch detection, but may employ a self-electrostatic capacitance-type touch detection.

Although the preferred embodiments of the present disclosure have been described above, the present disclosure is not limited by these embodiments. Contents disclosed in the embodiments are merely examples, and various modifications can be made in a scope without departing from the gist of the present disclosure. Appropriate modifications in a scope without departing from the gist of the present disclosure naturally belong to the technical scope of the present disclosure. At least one of various omission, replacement, and modification of the components can be performed in a scope without departing from the gist of the embodiments and modifications described above.

What is claimed is:

1. An input detection system, comprising:
   a plurality of drive electrodes arrayed in a detection region;
   a drive signal supply circuit that supplies a drive signal to the drive electrodes;
   a storage circuit that stores therein a table having information about a correction value for a drive frequency of the drive signal;
   a correction value selection circuit that selects the correction value for the drive frequency on the basis of the table; and
   an input support device that includes an LC circuit, a first electrode coupled to one end side of the LC circuit, and a second electrode coupled to the other end side of the LC circuit, wherein
   the input support device is disposed to overlap with some of the drive electrodes,
   a reference potential is supplied to the drive electrode overlapping with the first electrode, and
   the drive signal of the drive frequency corrected on the basis of information from the correction value selection circuit is supplied to the drive electrode overlapping with the second electrode.

2. The input detection system according to claim 1, wherein the correction value selection circuit includes a drive frequency change circuit, the drive signal supply circuit changes the drive frequency of the drive signal on the basis of information from the drive frequency change circuit, and supplies the changed drive signal sequentially to the drive electrodes, and the drive frequency change circuit corrects the drive frequency to the frequency indicating the maximum detection value on the basis of a relation between a plurality of the drive frequencies and each detection value.

3. The input detection system according to claim 2, wherein the drive signal supply circuit selects, among the drive electrodes, the drive electrodes that overlap with a partial region in which the input support device is detected, changes the drive frequency of the drive signal, and supplies the drive signal of the changed drive frequency sequentially to the selected drive electrodes.

4. The input detection system according to claim 1, further comprising a temperature sensor, wherein the correction value selection circuit acquires the table indicating a relation between a temperature and the drive frequency, and selects, on the basis of the table and information about a temperature from the temperature sensor, the drive frequency according to the temperature.

5. The input detection system according to claim 1, wherein the drive signal supply circuit supplies the drive signal of a predetermined frequency to the drive electrodes a plurality of times, and the correction value selection circuit corrects the drive frequency on the basis of a table indicating a relation between a drive count and a detection value.

6. An input detection system, comprising:

a plurality of drive electrodes arrayed in a detection region;

a drive signal supply circuit that supplies a drive signal to the drive electrodes;

a frequency detector that detects a frequency of a signal;

a correction value selection circuit that selects a correction value for a drive frequency of the drive signal; and an input support device that includes an LC circuit, a first electrode coupled to one end side of the LC circuit, and a second electrode coupled to the other end side of the LC circuit, wherein the input support device is disposed to overlap with some of the drive electrodes, a reference potential is supplied to the drive electrode overlapping with the first electrode, the drive signal is supplied from the drive signal supply circuit to the drive electrode overlapping with the second electrode, the frequency detector detects a frequency of a signal output from the LC circuit after the supply of the drive signal is stopped, and the correction value selection circuit selects the frequency of the drive signal on the basis of the frequency of the signal output from the LC circuit.

7. An input detection system, comprising:

a plurality of drive electrodes arrayed in a detection region;

a drive signal supply circuit that supplies a drive signal to the drive electrodes;

a storage circuit that stores therein a table having information about a correction value for a drive frequency of the drive signal;

a correction value selection circuit that selects the correction value on the basis of the table; and an input support device that includes an LC circuit, a first electrode coupled to one end side of the LC circuit, a second electrode coupled to the other end side of the LC circuit, and a switch element switching a resonance frequency of the LC circuit between a first frequency and a second frequency higher than the first frequency, wherein the input support device is disposed to overlap with some of the drive electrodes, a reference potential is supplied to the drive electrode overlapping with the first electrode, the drive signal is supplied from the drive signal supply circuit to the drive electrode overlapping with the second electrode, and the correction value selection circuit determines switching of the switch element on the basis of a detection value when the drive signal of the first frequency is supplied to the drive electrodes.

8. The input detection system according to claim 7, wherein the storage circuit includes a first table having a plurality of correction values for the drive frequency corresponding to the first frequency and a second table having a plurality of correction values for the drive frequency corresponding to the second frequency.

* * * * *